(12) United States Patent
Matsuno

(10) Patent No.: US 11,541,455 B2
(45) Date of Patent: Jan. 3, 2023

(54) GOLD-COATED FLAT SILVER PARTICLES, GOLD-COATED FLAT SILVER PARTICLE DISPERSION, METHOD OF MANUFACTURING GOLD-COATED FLAT SILVER PARTICLES, COATING FILM, AND ANTIREFLECTION OPTICAL MEMBER

(71) Applicant: FUJIFILM CORPORATION, Tokyo (JP)

(72) Inventor: Ryo Matsuno, Shizuoka (JP)

(73) Assignee: FUJIFILM CORPORATION, Tokyo (JP)

( * ) Notice: Subject to any disclaimer, the term of this patent is extended or adjusted under 35 U.S.C. 154(b) by 707 days.

(21) Appl. No.: 16/542,294

(22) Filed: Aug. 15, 2019

(65) Prior Publication Data

US 2019/0375005 A1 Dec. 12, 2019

Related U.S. Application Data

(63) Continuation of application No. PCT/JP2018/008646, filed on Mar. 6, 2018.

(30) Foreign Application Priority Data

Mar. 31, 2017 (JP) .............................. JP2017-071849

(51) Int. Cl.
*B22F 1/0545* (2022.01)
*B22F 9/24* (2006.01)
(Continued)

(52) U.S. Cl.
CPC ............ *B22F 1/0545* (2022.01); *B22F 1/068* (2022.01); *B22F 1/17* (2022.01); *B22F 9/24* (2013.01);
(Continued)

(58) Field of Classification Search
None
See application file for complete search history.

(56) References Cited

U.S. PATENT DOCUMENTS

| 5,184,662 A | 2/1993 | Quick et al. |
| 2008/0168863 A1 | 7/2008 | Sun et al. |

(Continued)

FOREIGN PATENT DOCUMENTS

| CN | 101909786 A | 12/2010 |
| CN | 102050584 A | 5/2011 |

(Continued)

OTHER PUBLICATIONS

English translation of JP 2016-109550, EPO, accessed Jun. 28, 2022.*

(Continued)

*Primary Examiner* — Xiaobei Wang
(74) *Attorney, Agent, or Firm* — Solaris Intellectual Property Group, PLLC

(57) ABSTRACT

Provided are gold-coated flat silver particles, a dispersion including the gold-coated flat silver particles and a dispersion medium, a method of the dispersion, a coating film including the gold-coated flat silver particles, and an antireflection optical member. The gold-coated flat silver particles include flat silver particles and a gold coating layer, in which an average thickness of the gold coating layer on principal planes of the particles is 0.1 nm to 2 nm, and a ratio of the average thickness of the gold coating layer on the principal planes of the particles to an average thickness of the gold coating layer on edge surfaces of the particles is 0.02 or higher.

11 Claims, 7 Drawing Sheets

(51) Int. Cl.
    *B22F 1/17* (2022.01)
    *B22F 1/068* (2022.01)
    *B22F 1/054* (2022.01)
    *C03C 17/00* (2006.01)
    *G02B 1/115* (2015.01)

(52) U.S. Cl.
    CPC ............ *C03C 17/007* (2013.01); *G02B 1/115* (2013.01); *B22F 1/0551* (2022.01); *B22F 2301/255* (2013.01); *B22F 2304/056* (2013.01); *C03C 2217/29* (2013.01); *C03C 2217/73* (2013.01); *Y10T 428/256* (2015.01)

(56) References Cited

U.S. PATENT DOCUMENTS

| | | |
|---|---|---|
| 2010/0224026 A1 | 9/2010 | Brennan Fournet et al. |
| 2010/0283013 A1 | 11/2010 | Sato et al. |
| 2011/0111210 A1 | 5/2011 | Matsunami et al. |
| 2011/0240905 A1 | 10/2011 | Funakubo et al. |
| 2011/0250437 A1 | 10/2011 | Funakubo |
| 2013/0071651 A1 | 3/2013 | Hakuta et al. |
| 2016/0291207 A1 | 10/2016 | Yasuda et al. |
| 2017/0052296 A1 | 2/2017 | Kiyoto et al. |
| 2017/0169911 A1* | 6/2017 | Hu ..................... B22F 1/054 |
| 2017/0199185 A1 | 7/2017 | Miyazawa et al. |
| 2019/0375005 A1 | 12/2019 | Matsuno |

FOREIGN PATENT DOCUMENTS

| | | |
|---|---|---|
| CN | 102219388 A | 10/2011 |
| CN | 104308184 A | 1/2015 |
| CN | 104837582 A | 8/2015 |
| CN | 105793740 A | 7/2016 |
| CN | 106458731 A | 2/2017 |
| JP | 2011-508072 A | 3/2011 |
| JP | 2011-219807 A | 11/2011 |
| JP | 2011-221149 A | 11/2011 |
| JP | 2011-252213 A | 12/2011 |
| JP | 2011-253093 A | 12/2011 |
| JP | 5636208 B2 | 12/2014 |
| JP | 2016-109550 A | 6/2016 |
| JP | 5960374 B2 | 8/2016 |
| JP | 2017-119827 A | 7/2017 |
| JP | 6663079 B2 | 3/2020 |

OTHER PUBLICATIONS

Office action dated Jun. 25, 2021, from the TIPO in a Taiwan patent application No. 107109419, corresponding to the instant patent application, with English language translation of the Search Report.
Tsai,D. et al., "Preparation and characterization of gold-coated silver triangular platelets in nanometer scale," Materials Chemistry and Physics, Apr. 15, 2005, vol. 90, No. 2-3, pp. 361-366.
Gotoh, Yasuo et al., "Silver Nanoparticle", Journal of the Adhesion Society of Japan, vol. 44, No. 11, Nov. 2008, pp. 414-419.
International Search Report issued in International Application No. PCT/JP2018/008646 dated May 15, 2018.
Written Opinion of the ISA issued in International Application No. PCT/JP2018/008646 dated May 15, 2018.
English language translation of the following: Office action dated Mar. 12, 2021 from the SIPO in a Chinese patent application No. 201880014469.7 corresponding to the instant patent application. This office action translation is submitted now in order to supplement the understanding of the cited references which are being disclosed in the instant Information Disclosure Statement.
Liu, Tingzhuo et al., "Core/Shell Nanostructures: Etching-Free Epitaxial Growth of Gold on Silver Nanostructures for High Chemical Stability and Plasmonic Activity", Advanced Functional Materials, 2015, vol. 25, p. 5435-5443.
Dai Nippon Toryo Co., LTD., "Nanoparticle Series" https://www.dnt.co.jp/technology/new-business/particle/, Mar. 6, 2016, archived by Wayback Machine.
Dai Nippon Toryo Co., Ltd., "Multi-colored Metallic Nanoparticles Silver Nanoplates" (Web flyer), https://www.dnt.co.jp/technology/new-business/particle/pdf/silver_nanoplates.pdf.
Dai Nippon Toryo Co., Ltd., "Multi-colored Metallic Nanoparticles Silver Nanoplates" (Web flyer), https://azscience.jp/pdf/news/recommended/product01/SilverNano-plateOrganicSolvent.pdf.
Kobayashi, Toshikatsu, "Color Development by Surface Plasmons and Its Application to Paints," Journal of the Imaging Society of Japan, 2011, vol. 50, No. 6, pp. 556-562.
Kobayashi, Toshikatsu, "Application of Noble Metal Nanoparticles to Colorants for Paints," Surface Science, 2005, vol. 26, No. 2, pp. 107-111.
Gao, Chuanbo et al., "Highly Stable Silver Nanoplates for Surface Plasmon Resonance Biosensing," Angewandte Chemie Intl. Ed., 2012, vol. 51, Wiley-VCH Verlag GmbH & Co., p. 5629-5633.
English language translation of the following: Notice of Reasons for Revocation dated Dec. 17, 2020 from the JPO in a Japanese patent No. 6663079 corresponding to the instant patent application. This office action translation is submitted now in order to supplement the understanding of the cited references which are being disclosed in the instant Information Disclosure Statement.

* cited by examiner

GOLD-COATED FLAT SILVER PARTICLES, GOLD-COATED FLAT SILVER PARTICLE DISPERSION, METHOD OF MANUFACTURING GOLD-COATED FLAT SILVER PARTICLES, COATING FILM, AND ANTIREFLECTION OPTICAL MEMBER

CROSS-REFERENCE TO RELATED APPLICATIONS

This application is a continuation application of International Application No. PCT/JP2018/008646, filed Mar. 6, 2018, the disclosure of which is incorporated herein by reference in its entirety. Further, this application claims priority from Japanese Patent Application No. 2017-071849, filed Mar. 31, 2017, the disclosure of which is incorporated herein by reference in its entirety.

BACKGROUND OF THE INVENTION

1. Field of the Invention

The present disclosure relates to gold-coated flat silver particles, a gold-coated flat silver particle dispersion, a method of manufacturing a gold-coated flat silver particle dispersion, a coating film, and an antireflection optical member.

2. Description of the Related Art

Noble metal particles of silver, gold, or the like are used for various purposes, for example, for an optical member such as an antireflection film to visible light, a reflection enhancing film, or an infrared shielding (heat insulating) film, for a colorant such as ink or paint, or for a detection reagent of a material to be tested. In addition, in order to improve stability to oxidation, surfaces of silver particles are coated with gold.

For example, JP2016-109550A discloses a suspension having a pH of 6 or lower used for, for example, an index for a detection reagent of a material to be tested using surface plasmon resonance (SPR) of silver nanoplates, the suspension including: particles obtained by coating silver nanoplate surfaces with gold; and a water-soluble polymer. It is known that this suspension is stable for freezing or freeze-drying. JP5636208B discloses a technique of adding $10^{-3}$ atom % to 5 atom % of metal that is more noble than silver to regions from surfaces of flat silver particles to 2 to 4 atomic layers in order to improve light fastness.

SUMMARY OF THE INVENTION

However, according to the investigation by the present inventors, it was found that, in the technique described in JP2016-109550A, there may be a case where all the surfaces of the flat silver particles (that is, all the principal planes and edge surfaces of the particles) cannot be uniformly and sufficiently coated with gold, specifically, a case where gold spherical particles or particles having a shape in which a plurality of spherical particles are attached to flat silver particles are formed. In particular, in a case where a gold coating process is desired for a dispersion of high-concentration flat silver particles, during preparation of a dispersion of high-concentration flat silver particles using the technique described in JP2016-109550A, the particles aggregate and precipitate. As a result, the dispersion of the high-concentration flat silver particles cannot be prepared, and a gold coating process cannot be performed.

In addition, the gold coating process on the flat silver particles described in JP5636208B is a galvanic replacement process of silver and gold using chloroauric acid. During gold coating, the shape of edge portions of flat silver particles may change, and all the particle surfaces may not be uniformly coated with gold while maintaining a desired particle shape. Therefore, a technique of uniformly coating all the particle surfaces with gold is desired.

In a case where flat silver particles are not uniformly coated with gold, oxidative resistance required for gold coating cannot be sufficiently improved.

An object to be achieved by one embodiment of the present invention is to provide gold-coated flat silver particles having excellent oxidative resistance and a dispersion including the gold-coated flat silver particles. An object to be achieved by another embodiment of the present invention is to provide a method capable of manufacturing a dispersion including gold-coated flat silver particle having excellent oxidative resistance with high productivity. In addition, an object to be achieved by still another embodiment of the present invention is to provide a coating film having excellent oxidative resistance and an antireflection optical member having excellent oxidative resistance that is formed of the coating film.

Specific means for achieving the object include the following aspects.

<1> Gold-coated flat silver particles comprising:
flat silver particles; and
a gold coating layer,
in which an average thickness of the gold coating layer on principal planes of the particles is 0.1 nm to 2 nm, and
a ratio of the average thickness of the gold coating layer on the principal planes of the particles to an average thickness of the gold coating layer on edge surfaces of the particles is 0.02 or higher.

<2> The gold-coated flat silver particles according to <1>, wherein the average thickness of the gold coating layer on the principal planes of the particles is 0.7 nm to 1.5 nm, and the ratio of the average thickness of the gold coating layer on the principal planes of the particles to the average thickness of the gold coating layer on the edge surfaces of the particles is 0.02 or higher.

<3> The gold-coated flat silver particles according to <1> or <2>,
in which an aspect ratio is 2 to 80.

<4> A gold-coated flat silver particle dispersion comprising:
the gold-coated flat silver particles according to any one of <1> to <3>; and
a dispersion medium.

<5> The gold-coated flat silver particle dispersion according to <4>,
wherein a silver concentration is 2 mmol/L or higher.

<6> The gold-coated flat silver particle dispersion according to <4> or <5>, further comprising:
an organic component in which a solubility product pKsp with a silver ion is 14 or higher and a reduction potential is lower than 700 mV.

<7> A method of manufacturing the gold-coated flat silver particle dispersion according to any one of <4> to <6>, the method comprising:
a flat silver particle manufacturing step; and
a gold coating step,
in which the flat silver particle manufacturing step includes a step of preparing a mixed solution including water, a silver salt, a dispersant, and a reducing agent and a step of mixing another silver salt in a solid state with the mixed solution obtained in the step of preparing the mixed solution and is a step of obtaining a flat silver particle dispersion, and the gold coating step is a step of obtaining the gold-coated flat silver particle dispersion by mixing a gold coating solution with the flat silver particle dispersion obtained in the flat silver particle manufacturing step, the gold coating solution including water, a gold salt, and a complexing agent in which a reduction potential of a complex formed using the complexing agent and gold ions is 0.5 V or lower.

<8> The method of manufacturing the gold-coated flat silver particle dispersion according to <7>, in which before the gold coating step, an edge surface adsorbent of the flat silver particles is added to the flat silver particle dispersion obtained in the flat silver particle manufacturing step.

<9> The method of manufacturing the gold-coated flat silver particle dispersion according to <7> or <8>, in which in the gold coating step, a molar ratio of an addition amount of the complexing agent in which the reduction potential of the complex formed using the complexing agent and gold ions is 0.5 V or lower to an addition amount of the gold salt is in a range of 2.5 to 10.

<10> The method of manufacturing the gold-coated flat silver particle dispersion according to any one of <7> to <9>, in which after the gold coating step, an organic component in which a solubility product pKsp with silver ions is 14 or higher and a reduction potential is lower than 700 mV is added to the gold-coated flat silver particle dispersion.

<11> A coating film comprising:

the gold-coated flat silver particles according to any one of <1> to <3>.

<12> The coating film according to <11>, further comprising:

an organic component in which a solubility product pKsp with silver ions is 14 or higher and a reduction potential is lower than 700 mV.

<13> An antireflection optical member that prevents incidence light of visible light from being reflected, the antireflection optical member comprising:

a laminate structure in which a transparent substrate, a metal fine particle-containing layer that is the coating film according to <11> or <12>, and a dielectric layer are laminated in this order, in which principal planes of the gold-coated flat silver particles are aligned in a range of 0° to 30° with respect to a surface of the metal fine particle-containing layer, the gold-coated flat silver particles are arranged in the metal fine particle-containing layer without forming a conduction path, and a thickness of the dielectric layer is set such that, in a case where incidence light is incident from a surface side of the dielectric layer to the laminate structure, reflected light on the surface of the dielectric layer is canceled out by interfering with reflected light at an interface between the dielectric layer and the metal fine particle-containing layer.

According to one embodiment of the present invention, it is possible to provide gold-coated flat silver particles having excellent oxidative resistance and a dispersion including the gold-coated flat silver particles. According to another embodiment of the present invention, it is possible to provide a method capable of manufacturing a dispersion including gold-coated flat silver particle having excellent oxidative resistance with high productivity. In addition, according to still another embodiment of the present invention, it is possible to provide a coating film having excellent oxidative resistance and an antireflection optical member that is formed of the coating film.

DESCRIPTION OF THE PREFERRED EMBODIMENTS

Figure 1A:
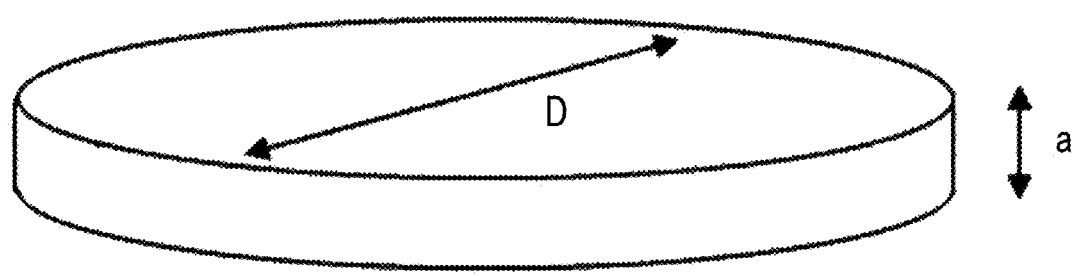
FIG. 1A is a schematic diagram showing an example of shape of a gold-coated flat silver particle.

The content of the present disclosure will be described in details. The following description has been made based on a representative embodiment of the present disclosure. However, the present disclosure is not limited to the embodiment.

In the present disclosure, numerical ranges represented by "to" include numerical values before and after "to" as minimum values and maximum values. Regarding numerical ranges that are described stepwise in this specification, an upper limit value or a lower limit value described in a numerical value may be replaced with an upper limit value or a lower limit value of another stepwise numerical range. In addition, regarding a numerical range described in the present disclosure, an upper limit value or a lower limit value described in a numerical value may be replaced with a value described in Examples.

In addition, in the present disclosure, in a case where a plurality of materials corresponding to each of components in a composition are present, the amount of each of components in the composition represents the total amount of the plurality of materials present in the composition unless specified otherwise.

In the present disclosure, a combination of preferable aspects is a more preferable aspect. In this specification, the term "step" represents not only an individual step but also a step which is not clearly distinguishable from another step as long as an effect expected from the step can be achieved.

[Gold-Coated Flat Particles and Gold-Coated Flat Particle Dispersion]

Gold-coated flat silver particles according to an embodiment of the present disclosure comprises: flat silver particles; and a gold coating layer, in which an average thickness of the gold coating layer on principal planes of the particles is 0.1 nm to 2 nm, and a ratio of the average thickness of the gold coating layer on the principal planes of the particles to an average thickness of the gold coating layer on edge surfaces of the particles is 0.02 or higher. The gold-coated flat silver particles according to the embodiment of the present disclosure are particles obtained by coating flat silver particles with gold to form a gold-coated silver layer on surfaces thereof. In addition, a gold-coated flat silver particle dispersion according to the embodiment of the present disclosure is a dispersion including the above-described gold-coated flat silver particles and a dispersion medium.

Hereinafter, the gold-coated flat silver particles according to the embodiment of the present disclosure will be appropriately referred to as "specific flat particles", and the gold-coated flat silver particle dispersion according to the embodiment of the present disclosure will be appropriately referred to as "specific particle dispersion".

(Specific Flat Particle)

The specific flat particles according to the embodiment of the present disclosure comprises: flat silver particles; and a gold coating layer, in which an average thickness of the gold coating layer on principal planes of the particles is 0.1 nm to 2 nm, and a ratio of the average thickness of the gold coating layer on the principal planes of the particles to an average thickness of the gold coating layer on edge surfaces of the particles is 0.02 or higher. As a result, excellent oxidative resistance can be exhibited as compared to the related art.

Here, a particle being "flat" represents that the shape of the particle includes: two principal planes facing each other; and an edge surface that connects the two principal planes to each other. "Principal planes" of a flat particle represent one set of parallel planes perpendicular to a thickness direction of the flat particle.

In this specification, "oxidative resistance" represents not only oxidative resistance in liquid but also oxidative resistance in air (for example, ozone fastness, nitrogen dioxide resistance, and oxidative resistance that is derived from another composition included in the composition and is accelerated by ultraviolet light or high-temperature and high-humidity conditions).

The specific flat particles are particles obtained by coating flat silver particles with gold to form a gold coating layer, and the gold coating layer can be detected using, for example, Auger Electron Spectroscopy (AES), X-ray Photoelectron Spectroscopy (XPS), Energy Dispersive X-ray Spectroscopy (EDS), or Time-of-Flight Secondary Ion Mass Spectrometry (TOF-SIMS).

In the specific flat particles, the average thickness of the gold coating layer on the principal planes of the particles is 0.1 nm to 2 nm, and the ratio of the average thickness of the gold coating layer on the principal planes of the particles to the average thickness of the gold coating layer on the edge surfaces of the particles is 0.02 or higher. From the viewpoint of maintaining oxidative resistance and optical characteristics of the flat particles, in the specific flat particles, it is more preferable the average thickness of the gold coating layer on the principal planes of the particles is 0.7 nm to 1.5 nm, and the ratio of the average thickness of the gold coating layer on the principal planes of the particles to the average thickness of the gold coating layer on the edge surfaces of the particles is 0.02 or higher.

The average thickness of the gold coating layer on the particle principal planes is 0.1 nm to 2 nm, preferably 0.4 nm to 1.8 nm, and more preferably 0.7 nm to 1.5 nm.

The average thickness of the gold coating layer can be obtained by obtaining a high-angle annular dark field scanning TEM (HAADF-STEM) image in a particle cross-sectional direction, measuring the thickness of the gold coating layer having a high brightness at five points of one particle in each of principal planes and an edge surface of the particle of the obtained image using an image analysis tool such as ImageJ (NIH: National Institutes of Health), and obtaining the average thickness on the principal planes and the average thickness on the edge surfaces from 20 particles in total.

The ratio of the average thickness of the gold coating layer on the principal planes of the particles to the average thickness of the gold coating layer on the edge surfaces of the particles is 0.02 or higher, preferably 0.1 or higher, and more preferably 0.3 or higher. The upper limit of the thickness ratio is not particularly limited and is preferably 10 or less. In a case where the thickness ratio of the gold coating layer is 0.02 or higher, excellent oxidative resistance is exhibited.

The thickness ratio is a value (AB) calculated by dividing the average thickness (A) of the gold coating layer on the principal planes of the particles by the average thickness (B) of the gold coating layer on the edge surfaces of the particles.

It is preferable that the specific flat particles are obtained by using a method of manufacturing the gold-coated flat silver particle dispersion according to the embodiment of the present disclosure described below, the method including: obtaining a flat silver particle dispersion in a flat silver particle manufacturing step; and subsequently performing a gold coating process on the obtained flat silver particle dispersion in a gold coating step.

Hereinafter, the shape and the like of the specific flat particles according to the embodiment of the present disclosure that are flat particles will be described.

<Shape>

The shape of the flat particles can be appropriately selected depending on the purposes without any particular limitation as long as it is flat. The shape of the specific flat particles reflects the shape of the flat silver particles before gold coating.

Examples of the shape of the flat particles include a triangular shape, a quadrangular shape, a hexagonal shape, an octagonal shape, and a circular shape. In particular, from the viewpoint of a high visible transmittance, a hexagonal or higher polygonal shape or a circular shape is more preferable.

The flat particle having a circular shape is not particularly limited as long as it has no corner and has a round shape in case of being observed with a transmission electron microscope (TEM) from above the principal planes, and can be appropriately selected depending on the purpose.

The flat particle having a hexagonal shape is not particularly limited as long as it has a hexagonal shape in case of being observed with a transmission electron microscope (TEM) from above the principal planes, and can be appropriately selected. For example, the corners of the hexagonal shape may be acute or obtuse and are preferably acute from the viewpoint of reducing the absorption of light in a visible range. The degree of obtuseness of the angles is not particularly limited and can be appropriately selected depending on the purpose.

<Average Particle Size (Average Equivalent Circle Diameter) and Coefficient of Variation>

The average equivalent circle diameter of the flat particles represents an average value of diameters (maximum lengths) of principal planes of a number of particles that is freely selected from an image obtained by observing the flat particles with a transmission electron microscope (TEM). The equivalent circle diameter is expressed by the diameter of a circle having an area equivalent to the projected area of each flat particle. The projected area of each of the specific flat particles can be obtained using a well-known method of measuring the area of the particle using an electron microscope image and correcting the measured area using a magnification. In this specification, the average particle size (average equivalent circle diameter) of the flat particles can be calculated by obtaining a particle size distribution from the equivalent circle diameters D of 200 flat particles and calculating an arithmetic mean thereof. The coefficient of variation in the particle size distribution of the flat particles can be obtained as a value (%) obtained by dividing the standard deviation of the particle size distribution by the above-described average particle size (average equivalent circle diameter).

The average equivalent circle diameter of the specific flat particles is preferably 10 nm to 5,000 nm and more preferably 30 nm to 1,000 nm.

The coefficient of variation in the particle size distribution of the specific flat particle is preferably 30% or lower and more preferably 10% or lower.

The coefficient of variation in the particle size distribution of the specific flat particles is, for example, a value (%) obtained by plotting a particle size distribution range of 200 flat particles used for the calculation of the average particle size, obtaining a standard deviation of the particle size distribution, and dividing the obtained standard deviation by the average value (average particle size) of the principal plane diameters (maximum lengths).

<Average Thickness of Particles>

Figure 1B:
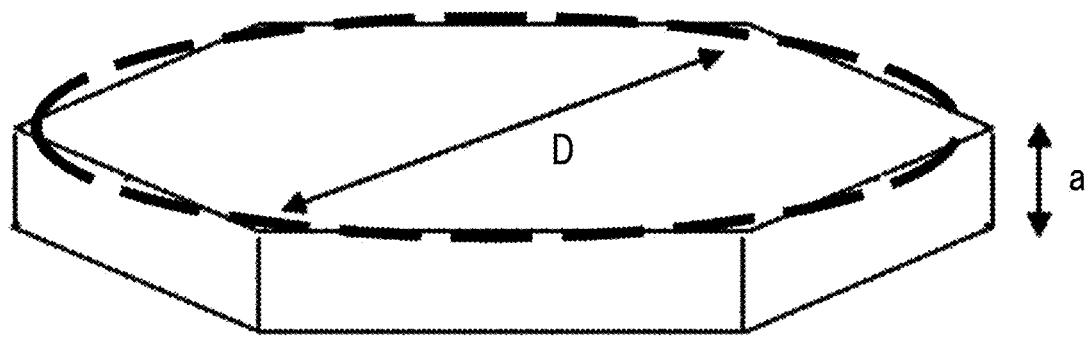
FIG. 1B is a schematic diagram showing another example of shape of a gold-coated flat silver particle.

The thickness of the flat particles corresponds to the distance between the principal planes of the specific flat particles and is, for example, the distance indicated by a in FIGS. 1A and 1B. The thickness of the flat particles can be measured using an atomic force microscope (AFM). Examples of a method of measuring the average particle thickness using an AFM include a method including: dripping a particle dispersion including the flat particles on a glass substrate; drying the particle dispersion; and measuring the thickness of one particle.

The average thickness of the specific flat particles is preferably 3 nm to 50 nm, more preferably 4 nm to 40 nm, and still more preferably 5 nm to 35 nm.

<Aspect Ratio>

An aspect ratio of the flat particles represents a value obtained by dividing the average particle size of the flat particles by an average particle thickness of the flat particles. For example, in a case where a flat particle has a circular shape, the aspect ratio is a value (D/a) obtained by dividing the diameter D by the thickness a in FIG. 1A. In a case where a flat particle has a hexagonal shape, the aspect ratio is a value (D/a) obtained by dividing the diameter D (equivalent circle diameter) by the thickness a, the diameter D being obtained by approximating a plane of the flat particle having a hexagonal shape to a circle having the same area as the plane as shown in FIG. 1B.

The aspect ratio of the specific flat particles is not particularly limited and can be appropriately selected depending on the purpose. The aspect ratio of the specific flat particles is preferably 2 to 80, more preferably 4 to 60, and still more preferably 10 to 40. In addition, from the viewpoints of obtaining gold coating properties and maintaining optical characteristics of the flat particles, the aspect ratio of the flat silver particles before gold coating is preferably 2 to 80, more preferably 4 to 60, and still more preferably 10 to 40.

(Specific Particle Dispersion)

The gold-coated flat silver particle dispersion (specific particle dispersion) according to the embodiment of the present disclosure is a dispersion including the above-described specific flat particles and a dispersion medium.

The same features as described above regarding the specific flat particles are applicable to the specific flat particles included in the specific particle dispersion.

The dispersion medium included in the specific particle dispersion is not particularly limited as long as it is a liquid component that can disperse the specific flat particles (dispersoid), and preferably includes water and another aqueous component.

The specific particle dispersion may be a liquid in a state where the specific flat particles are dispersed as they are after the end of the specific flat particle manufacturing step, or may be a liquid in which the specific flat particles that are isolated after manufacturing are dispersed in any dispersion medium.

The silver concentration of the specific particle dispersion is preferably 2 mmol/L or higher, more preferably 3 mmol/L to 1000 mmol/L, and still more preferably 4 mmol/L to 500 mmol/L. In a case where the silver concentration of the specific particle dispersion is 2 mmol/L or higher, the productivity of the specific particle dispersion can be further improved. For example, in a case where another composition and the specific particle dispersion are mixed with each other to form a coating film, the total concentration of solid contents is not likely to be limited. In addition, by adjusting the silver concentration of the specific particle dispersion not to be excessively high (for example, 1000 mmol/L or lower), an increase in the viscosity of the specific particle dispersion can be suppressed, and the dispersion stability of the particles can be maintained without deterioration in handleability, weighing accuracy, and the like.

The silver concentration of the specific particle dispersion can be measured by inductively coupled plasma (abbreviation: ICP) atomic emission spectroscopy.

In addition to the specific flat particles, the specific particle dispersion may include various other components selected depending on the purpose.

From the viewpoint of further improving oxidative resistance, it is preferable that the specific particle dispersion includes an organic component (hereinafter, also referred to as "specific organic component") in which a solubility product pKsp with silver ions is 14 or higher and a reduction potential is lower than 700 mV.

The solubility product pKsp of the specific organic component with silver ions is a value measured with reference to "Journal of the Society of Photography and Imaging of Japan, 13, 126, (1951)" and "A. Pailliofet and J. Pouradier, Bull. Soc. chim. France, 1982, I-445 (1982)". pKsp=$-\log_{10}$ Ksp. The reduction potential of the specific organic component is a value measured with reference to cyclic voltammetry described in "Electrochemical Measurement" (1984, Akira, Fujishima et al), pp. 150-167.

Examples of the specific organic component include 1-phenyl-1H-tetrazole-5-thiol, 5-amino-1,3,4-thiadiazole-2-thiol, 5-phenyl-1,3,4-oxadiazole-2-thiol, 1-(5-methylureidophenyl)-5-mercaptotetrazole, and N-(3-(5-mercapto-1H-tetrazole-1-yl)phenyl)-3-(methyl(pyrrolidine-1-yl) aminopropaneamide).

In a case where the specific particle dispersion includes the specific organic component, the addition amount of the specific organic component is preferably 1 mass % to 65 mass %, more preferably 5 mass % to 39 mass %, and still more preferably 7 mass % to 26 mass % with respect to the mass of silver in the specific particle dispersion from the viewpoint of improving oxidative resistance and suppressing aggregation of the particles.

The specific particle dispersion may further include other components selected depending on the purpose. Examples of the other components include a polymer compound, a surfactant, inorganic particles such as metal oxide particles, various water-soluble solvents, an antioxidant, a sulfidation inhibitor, a corrosion inhibitor, a viscosity adjuster, and a preservative.

In addition, one preferable aspect of the method of manufacturing the specific particle dispersion is a method of manufacturing the gold-coated flat particle dispersion described below. In the dispersion obtained in this manufacturing method, components included together with the specific flat particles are one aspect of the components that may be included in the specific particle dispersion according to the embodiment of the present disclosure.

Applications to which the above-described specific flat particles according to the embodiment of the present disclosure and the dispersion thereof are applicable are not particularly limited, and examples thereof include various applications, for example, an optical member such as an antireflection film, a reflection enhancing film, or an infrared shielding film, a construction member such as a heat shielding sheet or a heat insulating sheet, a colorant such as ink or paint, a decoration agent, a detection reagent of a material to be tested, and an antibacterial agent.

[Method of Manufacturing Gold-Coated Flat Particle Dispersion]

A method of manufacturing the gold-coated flat silver particles according to the embodiment of the present disclosure includes a flat silver particle manufacturing step and a gold coating step and is a method of manufacturing the specific particle dispersion. The flat silver particle manufacturing step includes a step of preparing a mixed solution including water, a silver salt, a dispersant, and a reducing agent and a step of mixing another silver salt in a solid state in the mixed solution obtained in the step of preparing the mixed solution, and is a step of obtaining the flat silver particle dispersion. The gold coating step is a step of obtaining the gold-coated flat silver particle dispersion by adding a gold coating solution to the flat silver particle dispersion obtained in the flat silver particle manufacturing step, the gold coating solution including water, gold, and a complexing agent in which a reduction potential of a complex formed using the complexing agent and gold is 0.5 V or lower.

The manufacturing method according to the embodiment of the present disclosure may include another step other than the flat silver particle manufacturing step and the gold coating step. Examples of the other step include a centrifugal separation and redispersion step, an ultrafiltration step, a solvent substitution step, and a drying concentration step.

In the manufacturing method according to the embodiment of the present disclosure, the uniform formation of the gold coating layer on the edge surfaces of the flat silver particles, which is difficult in the related art can be achieved, and the productivity of the dispersion is also high. Further, with the manufacturing method according to the embodiment of the present disclosure, a dispersion having a high silver concentration can be manufactured.

(Flat Silver Particle Manufacturing Step)

The flat silver particle manufacturing step includes at least: a step (hereinafter, referred to as "mixed solution preparing step") of preparing a mixed solution including water, a silver salt, a dispersant, and a reducing agent and a step (hereinafter, referred to as "mixing step") of mixing another silver salt in a solid state in the mixed solution obtained in the step of preparing the mixed solution, and is a step of obtaining the flat silver particle dispersion.

<Mixed Solution Preparing Step>

The mixed solution preparing step is a step of preparing a mixed solution including a silver salt, a dispersant, and a reducing agent in water. In the mixed solution preparing step, silver ions derived from the silver salt in water are reduced by the reducing agent, and silver particles as nuclei are formed and grow. In the mixed solution preparing step, it is preferable that silver particles are formed by (i) adding a dispersant and a reducing agent to water to prepare an aqueous solution and adding a silver salt aqueous solution to the obtained aqueous solution at a predetermined ratio, (ii) adding a dispersant and a silver salt to water to prepare an aqueous solution and adding a reducing agent aqueous solution to the obtained aqueous solution at a predetermined ratio, or (iii) adding a dispersant to water to prepare an aqueous solution and adding a silver salt aqueous solution and a reducing agent aqueous solution to the obtained aqueous solution at a predetermined ratio.

~Solvent of Mixed Solution~

The solvent of the mixed solution is not particularly limited as long as it is a solvent including water, and can be appropriately selected depending on the purpose. A solvent including 70 m mass % or higher of water is preferable, and a solvent including 90% or higher of water is more preferable. Examples of the solvent other than water include an alcohol such as methanol or ethanol, a glycol such as polyethylene glycol (PEG), acetonitrile, and acetone.

~Silver Salt used in Mixed Solution Preparing Step~

The silver salt used in the mixed solution preparing step is not particularly limited as long as it is soluble in water, and can be appropriately selected depending on the purpose. Examples of the silver salt include silver nitrate and silver perchlorate. As the silver salt, one kind may be used alone, or two or more kinds may be used in combination. The content of the silver salt in the mixed solution is not particularly limited and can be appropriately selected depending on the purpose. The content of the silver salt is preferably 0.0001 parts by mass to 10 parts by mass, more preferably 0.0005 parts by mass to 1 part by mass, and still more preferably 0.001 parts by mass to 0.1 parts by mass with respect to 100 parts by mass of the mixed solution.

The temperature of the mixed solution in the mixed solution preparing step is not particularly limited and can be appropriately selected depending on the purpose. The temperature of the mixed solution is preferably 0° C. to 100° C., more preferably 20° C. to 70° C., and still more preferably 30° C. to 60° C.

In a case where the temperature of the mixed solution is 0° C. or higher, the solution is not likely to be solidified. In a case where the temperature of the mixed solution is 100° C. or lower, the particle sizes of the silver particles are likely to be uniform. On the other hand, in a case where the temperature of the mixed solution is in the still more preferable range, there is an advantageous effect from the viewpoint of the uniformity of the particle size.

<Mixing Step>

The mixing step is a step of mixing another silver salt in a solid state with the mixed solution obtained in the mixed solution preparing step. That is, in the mixing step, at least one other silver salt is made to be present in a solid state.

Here, "mixing" in the mixed solution represents not only a case of adding another silver salt in a solid state formed from the outside of the mixed solution to the mixed solution and mixing the silver salt in a solid state with the mixed solution but also a case of forming another silver salt in a solid state in the mixed solution and mixing the silver salt in a solid state with the mixed solution. The other silver salt being "in a solid state" represents that the product of the concentration of silver ions in the other silver salt and the concentration of a ligand in the other silver salt is more than the solubility product (Ksp) of silver ions and a ligand and represents being insoluble in water. In the mixing step, at least one of water, a dispersant, a reducing agent, a silver salt, a ligand or a pH adjuster is added to the mixed solution obtained in the mixed solution preparing step in a given amount, at a given timing, or at a given mixing ratio such that silver particles grow. Through the mixing step, flat silver particles having a predetermined shape can be simply manufactured.

In order to make the other silver salt present in a solid state, an aqueous solution of another silver salt (silver salt solid) obtained by mixing a silver salt-containing aqueous solution and a ligand-containing aqueous solution may be added to the mixed solution (reaction kettle), the silver salt-containing aqueous solution including a silver salt, and the ligand-containing aqueous solution including a ligand that forms another silver salt in a solid state (silver salt solid) by coupling with silver ions in the silver salt-containing aqueous solution. Alternatively, another silver salt (silver salt solid) may be formed in the mixed solution (reaction kettle) by adding the ligand-containing aqueous solution to the reaction solution (reaction kettle) and adding the silver salt-containing aqueous solution to the mixed solution (reaction kettle), another silver salt (silver salt solid) powder may be added to the mixed solution (reaction kettle), or an aqueous dispersion of another silver salt (silver salt solid) powder may be added to the mixed solution (reaction kettle). Among these, an aspect in which a dispersion of another silver salt in a solid state (silver salt solid), that is, an aspect in which an aqueous solution of another silver salt (silver salt solid) obtained by mixing the silver salt-containing aqueous solution and the ligand-containing aqueous solution is added to the mixed solution (reaction kettle) or an aspect in which an aqueous dispersion of another silver salt (silver salt solid) powder is added to the mixed solution (reaction kettle) is preferable.

In the mixing step, silver ions are emitted from the added other silver salt (silver salt solid), and the silver ions are reduced by the reducing agent. As a result, silver particles formed in the mixed solution preparing step grow. It is preferable that the added other silver salt (silver salt solid) is removed at the end of the mixing step.

The concentration of silver ions dissolved in the mixed solution is determined depending on the solubility product with the ligand. Accordingly, even in a case where the mixed solution includes the silver salt with a high concentration, as long as the concentration of silver ions dissolved in the mixed solution is low, the reduction reaction slowly progresses, and the reaction can be performed in a state where the silver ion concentration distribution is low.

The temperature of the mixed solution in the mixing step is not particularly limited and can be appropriately selected depending on the purpose. The temperature of the mixed solution is preferably 0° C. to 100° C., more preferably 20° C. to 70° C., and still more preferably 30° C. to 60° C. In a case where the temperature of the mixed solution is 0° C. or higher, the solution is not likely to be solidified. In a case where the temperature of the mixed solution is 100° C. or lower, the particle sizes of the silver particles are likely to be uniform. On the other hand, in a case where the temperature of the mixed solution is in the still more preferable range, there is an advantageous effect from the viewpoint of the uniformity of the particle size.

~Other Silver Salt in Solid State~

The other silver salt in a solid state is not particularly limited and can be appropriately selected depending on the purpose, and examples thereof include silver sulfite, silver chloride, and silver oxide. The concentration of the other silver salt in a solid state (silver salt solid) is not particularly limited and can be appropriately selected depending on the purpose. The concentration of the other silver salt is preferably 1 mmol/L to 10,000 mmol/L, more preferably 2 mmol/L to 5,000 mmol/L, and still more preferably 5 mmol/L to 2,000 mmol/L. In a case where the concentration is 1 mmol/L or higher, the solid state can be favorably maintained. In a case where the concentration is 10,000 mmol/L or lower, the particle sizes of the silver particles are likely to be uniform. On the other hand, in a case where the concentration is in the still more preferable range, there is an advantageous effect from the viewpoint of the uniformity of the particle size and the productivity. The silver salt solid may be precipitated or dispersed.

The solubility product of the silver salt in a solid state is not particularly limited and can be appropriately selected depending on the purpose. The solubility product is preferably $10^{-30}$ to $10^{-3}$, more preferably $10^{-20}$ to $10^{-5}$, and still more preferably $10^{-15}$ to $10^{-5}$. In a case where the solubility product (Ksp) is $10^{-30}$ or higher (pKsp is higher than 30), an insoluble silver salt solid is not likely to be produced, and a reduction reaction is likely to progress. In a case where the solubility product (Ksp) is $10^{-3}$ or higher (pKsp is lower than 3), the silver salt solid can be obtained, and thus the addition amount of the ligand can be suppressed.

~Ligand~

The ligand is not particularly limited and can be appropriately selected depending on the purpose. Examples of the ligand include $Cl^-$, $Br^-$, $I^-$, $CN^-$, $SCN^-$, $SeCN^-$, $SO_3^{2-}$, $S^{2-}$, $OH^-$, $CrO_4^{2-}$, $CH_3COO^-$, $PO_4^{3-}$, $CO_3^{2-}$, oxalic acid, benzotriazole, benzoimidazole, and dimethyl dithiocarbamic acid. The following Table 1 shows pKsp of each of ligands and silver ions (pKsp=−log(Ksp)).

TABLE 1

| Ligand | pKsp |
|---|---|
| $Cl^-$ | 9.75 |
| $Br^-$ | 12.31 |
| $I^-$ | 16.09 |
| $CN^-$ | 15.8 |
| $SCN^-$ | 11.97 |
| $SeCN^-$ | 15.4 |
| $SO_3^{2-}$ | 13.8 |
| $S^{2-}$ | 49.1 |
| $OH^-$ | 7.71 |
| $CrO_4^{2-}$ | 11.6 |
| $PO_4^{3-}$ | 16.1 |
| $CO_3^{2-}$ | 11.1 |
| Oxalic Acid | 11.0 |
| Benzotriazole | 13.5 |
| Benzoimidazole | 11.5 |
| Dimethyl Dithiocarbamic Acid | 19.0 |

The steps from the mixed solution preparing step to the mixing step may be continuously performed on the same container or may be performed after replacing the container with another one halfway. The mixing step may be divided into a plurality of steps.

The silver concentration in the mixed solution in which the other silver salt in a solid state is mixed is not particularly limited and can be appropriately selected depending on the purpose. The silver concentration is preferably higher than 2 mmol/L and more preferably higher than 10 mmol/L. In a case where the silver concentration is higher than 2 mmol/L, the productivity is further improved. On the other hand, in a case where the silver concentration is in the more preferable range, there is an advantageous effect from the viewpoint of the productivity. "Silver concentration" is a total concentration value of silver ions and precipitated silver in the mixed solution. In addition, the silver concentration is the concentration of silver in the mixed solution in which the other silver salt in a solid state is mixed in the mixing step, and is not a concentration increased by centrifugal separation, ultrafiltration, or the like that is performed after the mixing step.

~Dispersant used in Mixed Solution Preparing Step and Mixing Step~

The dispersant used in the mixing step is not particularly limited as long as it is soluble in water, and can be appropriately selected depending on the purpose. Examples of the dispersant include gelatin, sodium citrate, sodium polystyrene sulfonate, polyvinyl alcohol, polyvinyl pyrrolidone, polyacrylamide, polyethyleneimine, polycarboxylic acid, and polyacrylic acid. As the dispersant, one kind may be used alone, or two or more kinds may be used in combination.

In particular, from the viewpoint of preventing aggregation, it is preferable that a polymer dispersant such as gelatin is included. In a case where two or more dispersants are included, the content of the polymer dispersant such as gelatin in the dispersants is preferably 1 mass % or higher. In a case where the content of the polymer dispersant such as gelatin is lower than 1 mass %, the dispersibility deteriorates, and the particles aggregate. The content of the dispersant is not particularly limited and can be appropriately selected depending on the purpose. The content of the dispersant is preferably 0.00001 parts by mass to 10,000 parts by mass, more preferably 0.0001 parts by mass to 5,000 part by mass, and still more preferably 0.001 parts by mass to 1,000 parts by mass with respect to 100 parts by mass of the silver salt. In a case where the content of the dispersant is 0.00001 parts by mass or higher, aggregation is likely to be suppressed. In a case where the content of the dispersant is 10,000 parts by mass or lower, the particle sizes of the silver particles are likely to be uniform. On the other hand, in a case where the content of the dispersant is in the still more preferable range, there is an advantageous effect from the viewpoint of preventing aggregation.

~Reducing Agent used in Mixed Solution Preparing Step and Mixing Step~

The reducing agent used in the mixing step is not particularly limited as long as it is soluble in water, and can be appropriately selected depending on the purpose. Examples of the reducing agent include sodium borohydride, hydroquinone sulfonic acid or a salt thereof, ascorbic acid or a salt thereof, and dimethylamino borane. As the reducing agent, one kind may be used alone, or two or more kinds may be used in combination. The content of the reducing agent is not particularly limited and can be appropriately selected depending on the purpose. The content of the reducing agent is preferably 0.0001 parts by mass to 100 parts by mass, more preferably 0.0005 parts by mass to 50 part by mass, and still more preferably 0.001 parts by mass to 10 parts by mass with respect to 100 parts by mass of the mixed solution. In a case where the content of the reducing agent is 0.0001 parts by mass or higher, the reduction reaction is likely to progress. In a case where the content of the reducing agent is 100 parts by mass or lower, the particle sizes of the silver particles are likely to be uniform. On the other hand, in a case where the content of the reducing agent is in the still more preferable range, there is an advantageous effect from the viewpoint of flatness and a silver particle size distribution.

~Edge Surface Adsorbent of Flat Silver Particles~

In the manufacturing method according to the embodiment of the present disclosure, it is preferable that an edge surface adsorbent of the flat silver particles is added to the flat silver particle dispersion obtained in the flat silver particle manufacturing step before the gold coating step and after the flat silver particle manufacturing step. By using the edge surface adsorbent, the formation of the gold coating layer on the edge surfaces of the flat silver particles is accelerated in the gold coating step described below. Therefore, the gold coating layer can be more uniformly formed on both the principal planes and the edge surfaces of the flat silver particles.

The edge surface adsorbent represents a compound that contributes to the improvement of the formation of the gold coating layer on the edge surfaces by being selectively adsorbed on {111} planes formed on the edge surfaces of the flat silver particles. More specifically, the flat silver particles according to the embodiment of the present disclosure are flat particles in which principal planes are {111} planes and an edge surface is an alternating layer of a {111} plane and a {100} plane. The edge surface adsorbent contributes to the improvement of the formation of the gold coating layer on the edge surfaces by being selectively adsorbed on {111} planes on the edge surfaces of the flat silver particles.

Figure 2:
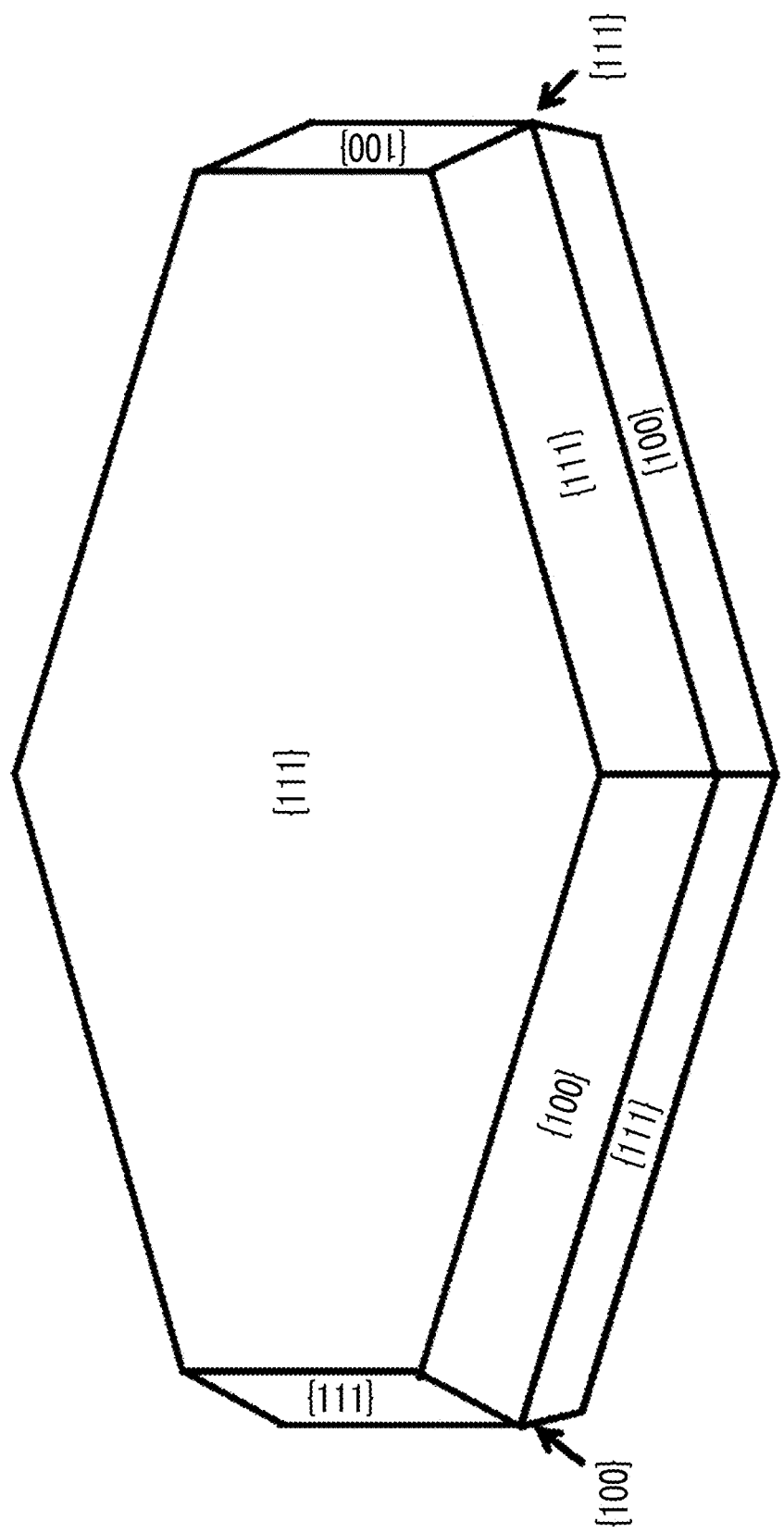
FIG. 2 is a schematic diagram showing a configuration example of principal planes ({111} planes) and an edge surface (an alternating layer of a {111} plane and a {100} plane) of a flat silver particle.

FIG. 2 schematically shows a flat silver particle having a hexagonal shape as a example that includes principal planes ({111} planes) and an edge surface (an alternating layer of a {111} plane and a {100} plane). As shown in FIG. 2, in the flat silver particle having a hexagonal shape of this example, two hexagonal principal planes are {111} planes (that is, a principal plane that is not shown in the drawing is also a {111} plane), and an edge surface that connects the two principal planes is shown as an alternating layer of a {111} plane and a {100} plane. The flat silver particle shown in FIG. 2 is an example of the flat silver particles according to the embodiment of the present disclosure. The flat silver particles according to the embodiment of the present disclosure is not limited to the specific shape shown in FIG. 2. The details of the crystal planes of the flat silver particles can be found in Adv. Func. Mater. 2008. 18. 2005-2016".

Examples of the edge surface adsorbent include hexadecyltrimethylammonium bromide (CTAB), hexadecyltrimethylammonium chloride (CTAC), hexadecyltrimethylammonium hydroxide (CTAOH), and polyvinyl pyrrolidone (PVP) (an abbreviation is present in parentheses added to each of the compounds). The edge surface adsorbent has an amine structure, and it is presumed that the edge surface adsorbent improves the formation of the gold coating layer on the edge surfaces by being selectively adsorbed on {111} planes on the edge surfaces of the flat silver particles through the amine structure.

From the viewpoint of the adsorption on the particle edge surfaces, a molar ratio of the addition amount of the edge surface adsorbent in the flat silver particle dispersion to the silver concentration is preferably 1 mol % to 50 mol %, more preferably 4 mol % to 30 mol %, and still more preferably 6 mol % to 20 mol %.

It is preferable that the edge surface adsorbent is added to the flat silver particle dispersion obtained in the flat silver particle manufacturing step before being mixed with the gold coating solution in the gold coating step described below. However, the edge surface adsorbent may be separately added to a predetermined gold coating solution used in the gold coating step.

(Gold Coating Step)

The gold coating step is a step of obtaining a dispersion of the specific flat particles by mixing the flat silver particle dispersion obtained in the flat silver particle manufacturing step with a gold coating solution (hereinafter, also simply referred to as "gold coating solution") including water, a gold salt, and a complexing agent (hereinafter, also referred to as "specific complexing agent") in which a reduction potential of a complex formed using the complexing agent and gold ions is 0.5 V or lower.

<Gold Coating Solution>

The gold coating solution includes water, a gold salt, and the specific complexing agent, preferably further includes a reducing agent, a pH buffer agent, and a pH adjuster, and may further include other components such as a complex stabilizer or a dispersant.

~Gold Salt~

As the gold salt included in the gold coating solution, at least one water-soluble gold salt compound is preferable. Examples of the water-soluble gold salt compound include gold (I) potassium cyanide, gold (II) potassium cyanide, gold (I) sodium sulfite, gold (III) sodium chloride hydrate, and gold (III) potassium chloride. From the viewpoints of stability, supply performance, and stability, gold (III) sodium chloride hydrate is more preferable.

From the viewpoint of the formation of the gold coating layer, a molar ratio of the addition amount of the gold salt in the gold coating solution to the silver concentration is preferably 1 mol % to 200 mol %, more preferably 5 mol % to 150 mol %, and still more preferably 10 mol % to 100 mol %. It is preferable that the water-soluble gold salt compound is used such that the addition amount of gold in the gold coating solution is in the above-described range.

~Specific Complexing Agent~

The gold coating solution includes at least one complexing agent (specific complexing agent) in which a reduction potential of a complex formed using the complexing agent and gold ions is 0.5 V or lower. The specific complexing agent is not particularly limited as long as it is a compound in which a reduction potential of a complex formed using the complexing agent and gold ions is 0.5 V or lower. The use of the specific complexing agent can reduce the reduction potential of gold reduction, that is, can cause gold to be slowly reduced in the gold coating process, and thus contributes to uniform gold coating.

Examples of the gold complex having a reduction potential ($E_0$ vs. NHE; hereinafter, the same shall be applied) of 0.5 V or lower that is formed using the specific complexing agent include $Au(CN)^{2-}$ ($E_0=-0.60$), $Au(CyS)^{3-}$ ($E_0=-0.14$), $Au(SO_3)_2^{3-}$ ($E_0=0.11$), $Au(S_2O_3)_2^{3-}$ ($E_0=0.15$), $Au(th)_2^+$ ($E0=0.38$), and $Au(OH)_2^-$ ($E_0=0.40$) (where th represents a thiourea ion, and CyS represents a cysteine ion). As the specific complexing agent, a compound that forms the gold complex may be used.

Examples of the specific complexing agent include a cyanide (for example, sodium cyanide, potassium cyanide, or ammonium cyanide), thiosulfuric acid, a thiosulfate (for example, sodium thiosulfate, potassium thiosulfate, or ammonium thiosulfate), a sulfite (for example, sodium sulfite, potassium sulfite, or ammonium sulfite), and thiourea. Among these, sodium sulfite or sodium thiosulfate is preferable from the viewpoint of complex stability and environmental burden.

From the viewpoint of the uniform formation of the gold coating layer and complex stability, a molar ratio of the addition amount of the specific complexing agent in the gold coating solution to the addition amount of gold is preferably in a range of 2.5 to 10 and more preferably in a range of 3.5 to 8.

It is preferable that gold and the specific complexing agent are included in the gold coating solution by preparing a mixed solution (hereinafter, also referred to as "gold reduction solution") including water, a water-soluble gold compound, and the specific complexing agent in advance and preparing the gold coating solution using the gold reduction solution. The gold reduction solution may further include other components (for example, a pH adjuster, a complex stabilizer, or a dispersant).

~Water~

The gold coating solution includes water as a main solvent. Here, the main solvent represents a solvent in which the content in the gold coating solution is 60 mass % or higher. The content of water in the gold coating solution is not particularly limited and is preferably 80 mass % or higher and more preferably 90 mass % to 99.9 mass %. The gold coating solution may include a solvent other than water.

~Reducing Agent~

It is preferable that the gold coating solution includes at least one reducing agent. The reducing agent is not particularly limited as long as it is applicable to the gold coating process and is soluble in water, and can be appropriately selected depending on the purpose. Examples of the reducing agent include ascorbic acid or a salt thereof, sodium borohydride, hydroquinone sulfonic acid or a salt thereof, and dimethylamino borane.

A molar ratio of the content of the reducing agent in the gold coating solution to the gold concentration is preferably 5 mmol/L to 100 mmol/L, more preferably 10 mmol/L to 50 mmol/L, and still more preferably 20 mmol/L to 40 mmol/L.

~Other Components~

The gold coating solution may further include other components than water, a gold salt, and the specific complexing agent. Examples of the other components include: an amino acid such as glycine or alanine; a pH buffer agent having an acid dissociation constant of 8 or higher such as a good buffer agent, for example, N,N-bis(2-hydroxyethyl)glycine, N-cyclohexyl-2-hydroxy-3-aminopropanesulfonic acid, or N-cyclohexyl-2-aminoethanesulfonic acid; a pH adjuster such as sodium hydroxide; a complex stabilizer; and a dispersant. Among these components, one kind or two or more kinds can be freely selected and used.

~Preparation of Gold Coating Solution~

The gold coating solution may be prepared by mixing the respective components included in the gold coating solution. An aspect in which the gold coating solution is prepared by preparing a mixed solution (gold reduction solution) including water, a water-soluble gold salt compound, and the specific complexing agent in advance and mixing the gold reduction solution with water, a reducing agent, and other optional components is preferable. The components such as the reducing agent other than the gold reduction solution may be used as they are, and a solution in which the components are dissolved in any solvent such as water may be prepared and used.

A mixing method that is applied to the preparation of the gold coating solution is not particularly limited, and a well-known mixing method such as stirring may be used.

The pH of the gold coating solution is preferably 5.5 or higher, and as the pH of the gold coating solution increases, the gold coating process tends to be more stable. Therefore, it is preferable that the pH of the gold coating solution is adjusted to be, for example, 10 or higher using a pH adjuster. In addition, a change in the adjusted pH depending on the reaction may be suppressed using a pH buffer agent.

~Gold Coating Process~

The gold coating process in the gold coating step may be performed by mixing the gold coating solution and the flat silver particle dispersion obtained in the flat silver particle manufacturing step with each other. By performing the gold coating process using the gold coating solution according to the embodiment of the present disclosure on the flat silver particle dispersion obtained in the flat silver particle manufacturing step, the gold coating layer can be uniformly formed on both the principal planes and edge surfaces of the flat silver particles.

An aspect where the gold coating solution and the flat silver particle dispersion are mixed with each other is not particularly limited. The gold coating solution and the flat silver particle dispersion may be mixed with each other at once, may be mixed with each other while adding the flat silver particle dispersion to the gold coating solution bit by bit, and may be mixed with each other while adding the gold coating solution to the flat silver particle dispersion bit by bit. It is preferable that mixing is performed while performing stirring using any stirring means.

From the viewpoint of gold coating, it is preferable that the flat silver particle dispersion is mixed with the gold coating solution at once.

Specific mixing means for mixing the flat silver particle dispersion with the gold coating solution at once is not particularly limited, and a general batchwise mixer or a micromixer may be used. Examples of a commercially available micromixer include a micromixer having an interdigital channel structure: "Single Mixer" and "Caterpillar Mixer" (manufactured by Institut fur Mikrotechnik Mainz OMNI) GmbH); "Microglass Reactor" (manufactured by Microglass Co., Ltd.); "CYTOS" (manufactured by CPC system Co., Ltd.); "YM-1 type mixer and YM-2 type mixer" (manufactured by Yamatake Corporation); "Mixing Tee and Tee (T-connector, Y-connector)" (manufactured by Shimadzu GLC Ltd.); "IMT Chip Reactor" (manufactured by Institute of Microchemical Technology Co., Ltd.); "Micro High Mixer" (manufactured by Toray Engineering Co., Ltd.); and a central collision type mixer (K-M type). Any of these can be used for manufacturing the specific flat particles according to the embodiment of the present disclosure.

The liquid temperature of the gold coating solution during mixing is preferably 10° C. to 80° C. In addition, the liquid temperature of the flat silver particle dispersion is preferably about 25° C. to 80° C. It is preferable that the mixed solution obtained by mixing the flat silver particle dispersion with the gold coating solution is heated. The heating temperature is preferably 25° C. to 80° C. and more preferably 30° C. to 70° C. The heating time is preferably 0.5 hr to 8 hr and more preferably 1 hr to 6 hr. It is preferable that heating is performed while performing stirring using any stirring means.

The dispersion of the specific flat particles obtained through the gold coating step may be used as it is or may be used after adding other components thereto depending on the purpose.

From the viewpoint of further improving oxidative resistance, it is preferable that an organic component (specific organic component) in which a solubility product pKsp with silver ions is 14 or higher and a reduction potential is lower than 700 mV is added to the gold-coated flat silver particle dispersion after the gold coating step. The same features as described above regarding the specific particle dispersion according to the embodiment of the present disclosure is applicable to the details of the contents of the specific organic component and the dispersion.

[Coating Film]

A coating film according to the embodiment of the present disclosure is a coating film including the specific flat particles according to the embodiment of the present disclosure and exhibits excellent oxidative resistance because it includes the specific flat particles according to the embodiment of the present disclosure.

The coating film according to the embodiment of the present disclosure is not particularly limited as long as it includes the specific flat particles and is a film formed by coating, and a preferable formation aspect thereof is an aspect where the coating is formed using a coating solution prepared by adding components selected depending on the use and characteristics of the desired coating film to the specific particle dispersion according to the embodiment of the present disclosure.

The coating film according to the embodiment of the present disclosure exhibits excellent durability such as ozone fastness because the specific flat particles having excellent oxidative resistance are dispersed in the film. Therefore, the coating film according to the embodiment of the present disclosure is preferably applied to a member that requires weather fastness for an outdoor use or the like.

It is preferable that the coating film according to the embodiment of the present disclosure includes an organic component (specific organic component) in which a solubility product pKsp with silver ions is 14 or higher and a reduction potential is lower than 700 mV. That is, it is preferable that the coating film according to the embodiment of the present disclosure is formed using a coating solution including the specific organic component. The same features as described above regarding the specific particle dispersion according to the embodiment of the present disclosure is applicable to the details of the specific organic component. The content of the specific organic component in the coating film is preferably 1 mass % to 65 mass %, more preferably 5 mass % to 39 mass %, and still more preferably 7 mass % to 26 mass % with respect to the mass of silver in the specific particle dispersion from the viewpoint of improving oxidative resistance and suppressing aggregation of the specific flat particles.

It is preferable that the coating solution for forming the coating film is prepared using other components that may be used for the desired coating film in addition to the specific particle dispersion and the specific organic component. Examples of the other components include a polymer compound such as a synthetic polymer or a natural polymer, inorganic particles such as metal oxide particles, a surfactant, a solvent such as water, alcohol, or glycol, an antioxidant, a sulfidation inhibitor, a corrosion inhibitor, a viscosity adjuster, and a preservative. The other components may be appropriately selected depending on the use of the coating film.

As a coating method, a well-known coating method can be used, and examples thereof include a coating method using a dip coater, a die coater, a slit coater, a bar coater, or a gravure coater, a Langmuir-Blodgett film (LB film) method, a self-organization method, and a spray coating method.

The thickness, characteristics, and the like of the coating film may be appropriately set depending on the use of the coating film. For example, features described below regarding antireflection optical member according to the embodiment of the present disclosure are applicable to various characteristics such as thickness of transmittance in a case where the coating film is applied to an antireflection optical member.

[Antireflection Optical Member]

An antireflection optical member according to the embodiment of the present disclosure is an antireflection optical member that prevents incidence light of visible light from being reflected, the antireflection optical member comprising: a laminate structure in which a transparent substrate, a metal fine particle-containing layer that is the coating film according to the embodiment of the present disclosure, and a dielectric layer are laminated in this order, in which principal planes of the gold-coated flat silver particles are aligned in a range of 0° to 30° with respect to a surface of the metal fine particle-containing layer, the gold-coated flat silver particles are arranged in the metal fine particle-containing layer without forming a conduction path, and a thickness of the dielectric layer is set such that, in a case where incidence light is incident from a surface side of the dielectric layer to the laminate structure, reflected light on the surface of the dielectric layer is canceled out by interfering with reflected light at an interface between the dielectric layer and the metal fine particle-containing layer.

Hereinafter, an embodiment of an antireflection optical member according to the present disclosure will be described with reference to the drawings. The drawings to be referred to show an example of the antireflection optical member, and the antireflection optical member according to the embodiment of the present disclosure is not limited thereto. In each of the drawings, components represented by the same reference numerals are the same components.

Figure 3:
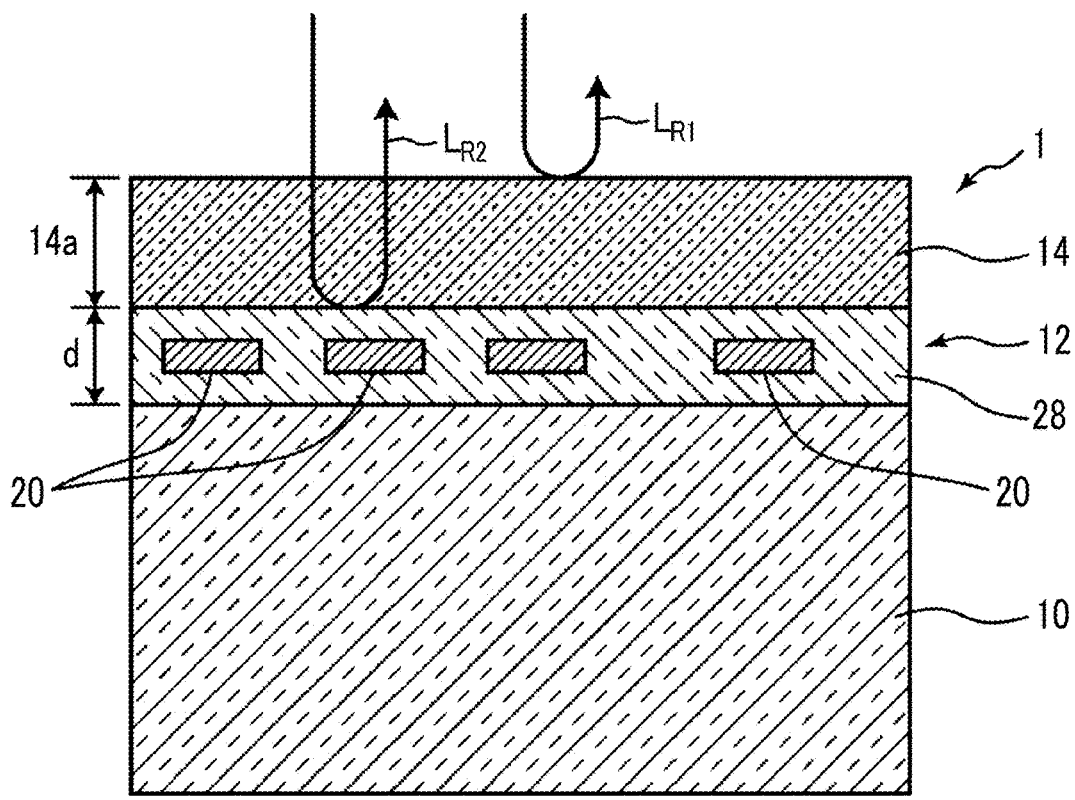
FIG. 3 is a schematic diagram showing an example of an embodiment of an antireflection optical member.

FIG. 3 is a schematic cross-sectional view showing a configuration of an antireflection optical member 1 that is one embodiment of the antireflection optical member according to the present disclosure. As shown in FIG. 3, the antireflection optical member 1 is an antireflection optical member that prevents reflection of incidence light at a predetermined wavelength and is used in a predetermined medium. The antireflection optical member 1 has a laminated structure in which a transparent substrate 10, a metal fine particle-containing layer 12, and a dielectric layer 14 are laminated in this order, the transparent substrate 10 having a first refractive index $n_1$ higher than a refractive index $n_0$ of the medium, the metal fine particle-containing layer 12 including a plurality of gold-coated flat silver particles (specific flat particles) 20, and the dielectric layer 14 having a second refractive index $n_2$ higher than the refractive index $n_0$ of the medium.

The principal planes of the plurality of specific flat particles 20 included in the metal fine particle-containing layer 12 are aligned in a range of 0° to 30° with respect to the surface of the metal fine particle-containing layer. As shown in FIG. 3, the specific flat particles 20 are arranged in the metal fine particle-containing layer 12 without forming a conduction path. In addition, a thickness 14a of the dielectric layer 14 is set such that, in a case where incidence light is incident from a surface side of the dielectric layer 14 to the laminate structure, reflected light $L_{R1}$ on the surface of the dielectric layer 14 is canceled out by interfering with reflected light $L_{R2}$ at an interface between the dielectric layer 14 and the metal fine particle-containing layer 12.

The antireflection optical member according to the embodiment of the present disclosure may be an antireflection film (film-shaped antireflection optical member) that is used after being attached to a window glass or a liquid crystal display to which an antireflection function is imparted, or may be a lens having a surface to which an antireflection optical function is imparted.

The predetermined medium is a medium that fills a space where the antireflection optical member is used, and is, for example, air ($n_0=1$) or water ($n_0=1.33$) having a refractive index of about 1.4 or lower. However, the predetermined medium varies depending on the use of the antireflection optical member. In the present disclosure, the predetermined medium is not particularly limited. Accordingly, the refractive indices of the respective layers are appropriately set depending on the use (a medium of a space to be used).

The incidence light having the predetermined wavelength is light at a wavelength where reflection is to be prevented, and can be freely set depending on the purpose. However, for example, in a case where the antireflection optical member is used for antireflection of a liquid crystal display or the like, the incidence light is visible light (380 nm to 780 nm) having visibility to eyes. In addition, for example, in a case where the antireflection optical member is used for antireflection of a liquid crystal display or the like, it is preferable that the antireflection effect is exhibited such that a wavelength range where the reflectivity is 0.5% or lower is in a range of 100 nm or longer. Hereinafter, each of the components of the optical member according to the embodiment of the present disclosure will be described in more detail.

<Transparent Substrate>

The transparent substrate 10 is not particularly limited as long as it is optically transparent to the incidence light having the predetermined wavelength that has the first refractive index $n_1$ higher than the refractive index $n_0$ of the predetermined medium, and can be appropriately selected depending on the purpose. For example, in a case where the wavelength where reflection is to be prevented is in a visible range, a substrate having a visible transmittance of 70% or higher and preferably 80% or higher is used as the transparent substrate. In a case where the wavelength where reflection is to be prevented is in a near infrared range, a substrate having a high transmittance in a near infrared range may be used.

The first refractive index $n_1$ is not particularly limited as long as it is higher than the refractive index $n_0$ of the predetermined medium. As a difference between the refractive indices increases, reflection of light incident on the transparent substrate increases, and the necessity for antireflection increases. Therefore, it is effective that the difference between the refractive indices is 12% or higher and preferably 20% or higher in the configuration of the antireflection optical member according to the embodiment of the present disclosure. In particular, it is effective that the predetermined medium is air and $n_0=1$ in the configuration of the antireflection optical member according to the embodiment of the present disclosure because the difference between the refractive indices is large. In addition, the refractive index of the transparent substrate is preferably lower than 1.8.

The shape, structure, size, material, and the like, of the transparent substrate 10 are not particularly limited and can be appropriately selected according to the purpose. Examples of the shape of the transparent substrate include a film shape and a flat shape. The transparent substrate may have a single-layer structure or a laminate structure, and the size thereof may be determined depending on the intended use. Examples of a material of the transparent substrate include a film or a laminated film formed of glass, a polyolefin resin such as polyethylene, polypropylene, poly-4-methylpentene-1, or polybutene-1; a polyester resin such as polyethylene terephthalate or polyethylene naphthalate; a polycarbonate resin, polyvinyl chloride resins, a polyphenylene sulfide resin, a polyether sulfone resin, a polyethylene sulfide resin, a polyphenylene ether resin, a styrene resin, an acrylic resin, a polyamide resin, a polyimide resin, or a cellulose resin such as cellulose acetate. Among these, a triacetyl cellulose (TAC) film or a polyethylene terephthalate (PET) film is preferable.

In a case where the transparent substrate 10 has a flat shape or a film shape, the thickness thereof is not particularly limited and can be appropriately selected depending on the intended use of antireflection. In a case where the transparent substrate 10 has a film shape, the thickness thereof is typically about 10 µm to 500 µm. The thickness of the transparent substrate 10 is preferably 10 µm to 100 µm, more preferably 20 µm to 75 µm, and still more preferably 35 µm to 75 µm. As the thickness of the transparent substrate 10 increases, adhesion failure is not likely to occur. In addition, as the thickness of the transparent substrate 10 decreases, the transparent substrate 10 is not excessively strong as a material and tends to be easily adhered to a building material or to a window glass of an automobile as an antireflection film. Further, as the thickness of the transparent substrate 10 sufficiently decreases, the visible transmittance increases, the costs of raw materials can be suppressed.

<Metal Fine Particle-Containing Layer>

The metal fine particle-containing layer 12 is configured by applying the above-described coating film according to the embodiment of the present disclosure to the metal fine particle-containing layer and may include the specific flat particles and the other components. The metal fine particle-containing layer 12 is a layer formed by adding the plurality of specific flat particles 20 to a binder 28. The specific flat particles are randomly (that is, aperiodically) arranged in the metal fine particle-containing layer 12 in a plan view.

The same features as described above regarding the specific flat particles are applicable to the specific flat particles 20.

In addition, the proportion of the specific flat particles 20 aligned in a range of the angle θ of 0° to 30° is preferably 60% by number or higher, more preferably 70% by number or higher, and still more preferably 90% by number or higher with respect to the total number of the specific flat particles 20 included in the metal fine particle-containing layer 12. The metal fine particle-containing layer 12 may include metal fine particles other than the specific flat particles 20 as long as the effects of the antireflection optical member according to the embodiment of the present disclosure do not deteriorate. The proportion of the specific flat particles 20 aligned in a range of the angle θ of 0° to 30° is preferably 60% by number or higher, more preferably 65% by number or higher, and still more preferably 70% by number with respect to the total number of the plurality of metal fine particles included in the metal fine particle-containing layer 12. In a case where the proportion of the specific flat particles 20 is 60% by number or higher, oxidative resistance can be further secured.

In addition, it is preferable that the specific flat particles 20 are segregated on one surface of the metal fine particle-containing layer 12.

~Plane Alignment~

Figure 4:
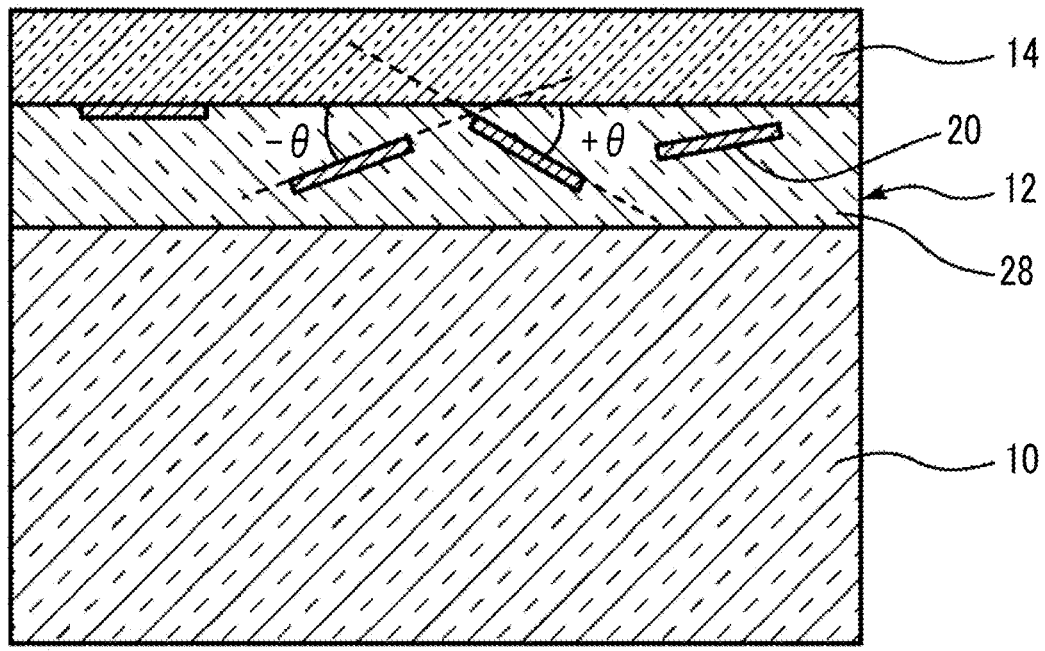
FIG. 4 is a schematic cross-sectional view showing a state where the metal fine particle-containing layer including the gold-coated flat silver particles is present in the antireflection optical member, in which an angle (θ) between the metal fine particle-containing layer including the gold-coated flat silver particles (parallel to a plane of a substrate) and a principal plane (plane which determines an equivalent circle diameter D) of a specific flat particle is shown.

In the metal fine particle-containing layer 12, it is preferable that the principal planes of the specific flat particles 20 are aligned in a range of 0° to 30° with respect to the surface of the metal fine particle-containing layer 12. That is, in FIG. 4, it is preferable that an angle (±θ) between the surface of the metal fine particle-containing layer 12 and a principal plane (plane which determines the equivalent circle diameter D) of the specific flat particle 20 or an extended line of the principal plane is 0° to 30°. The angle (±θ) is more preferably in a range of 0° to 20°, and still more preferably in a range of 0° to 10°. In a case where a cross-section of the antireflection optical member is observed, it is more preferable that the specific flat particles 20 are aligned in a state where the tilt angle (±θ) shown in FIG. 4 is small. In a case where θ is higher than ±30°, the absorption of visible light in the antireflection optical member tends to increase.

In addition, the proportion of the specific flat particles 20 aligned in the range of the angle θ of 0° to ±30° is preferably 50% by number or higher, more preferably 70% by number or higher, and still more preferably 90% by number or higher with respect to the total number of the specific flat particles 20.

Whether or not the principal planes of the specific flat particles are aligned to one surface of the metal fine particle-containing layer can be determined using, for example, a method including: preparing an appropriate cross-section specimen; and observing and evaluating the metal particle-containing layer and the specific flat particles in the specimen. Specifically, in this method, a cross-section sample or a cross-section specimen sample of the antireflection optical member is prepared using a microtome or focused ion beams (FIB), and this sample is observed using various microscopes (for example, a field emission scanning electron microscope (FE-SEM) or a transmission electron microscope (TEM)) to obtain an image for the evaluation.

A method of observing the cross-section sample or the cross-section specimen sample prepared as described above is not particularly limited as long as whether or not the principal planes of the specific flat particles are aligned to one surface of the metal fine particle-containing layer in the sample can be determined. For example, a method using an FE-SEM, a TEM, or the like can be used. The cross-section sample may be observed using an FE-SEM, and the cross-section specimen sample may be observed using a TEM. In the evaluation using an FE-SEM, it is preferable that the FE-SEM has a spatial resolution in which the shape and the tilt angle (±θ in FIG. 4) of the specific flat particles can be clearly determined.

Figure 5A:
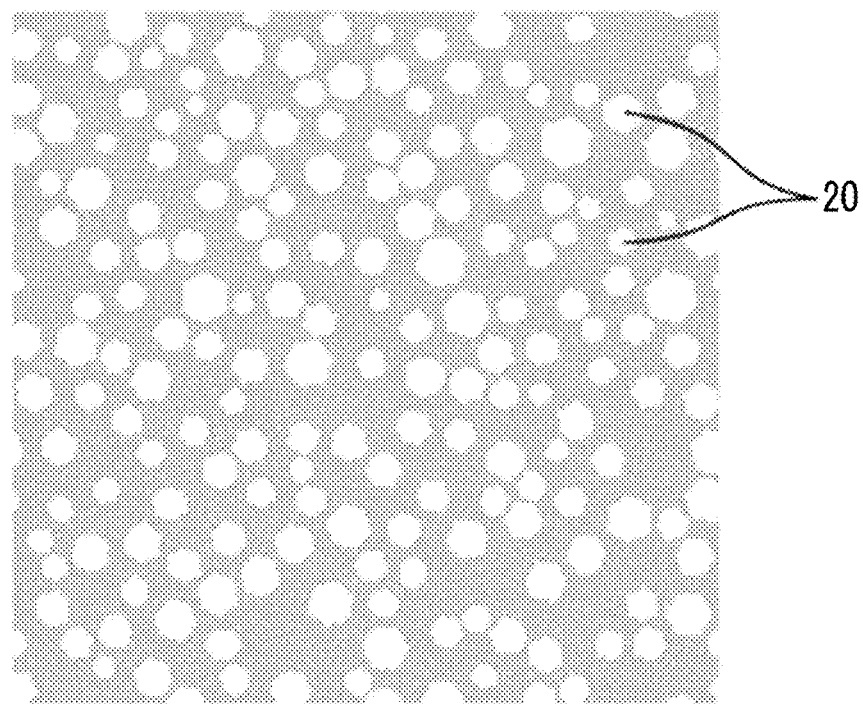
FIG. 5A is a diagram showing a state where the gold-coated flat silver particles are distributed (100% isolated) in the metal fine particle-containing layer.
Figure 5B:
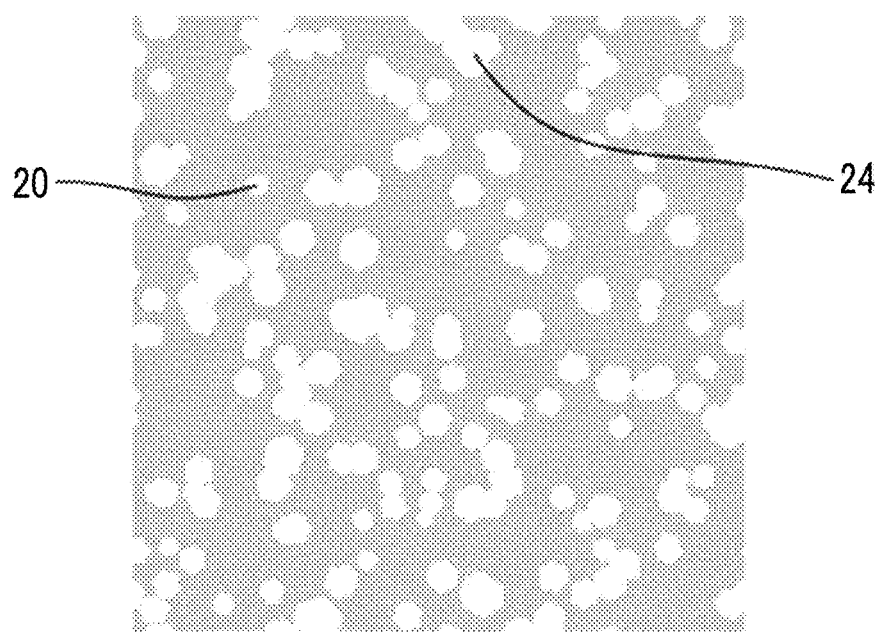
FIG. 5B is a diagram showing a state where the gold-coated flat silver particles are distributed (50% isolated) in the metal fine particle-containing layer.
Figure 5C:
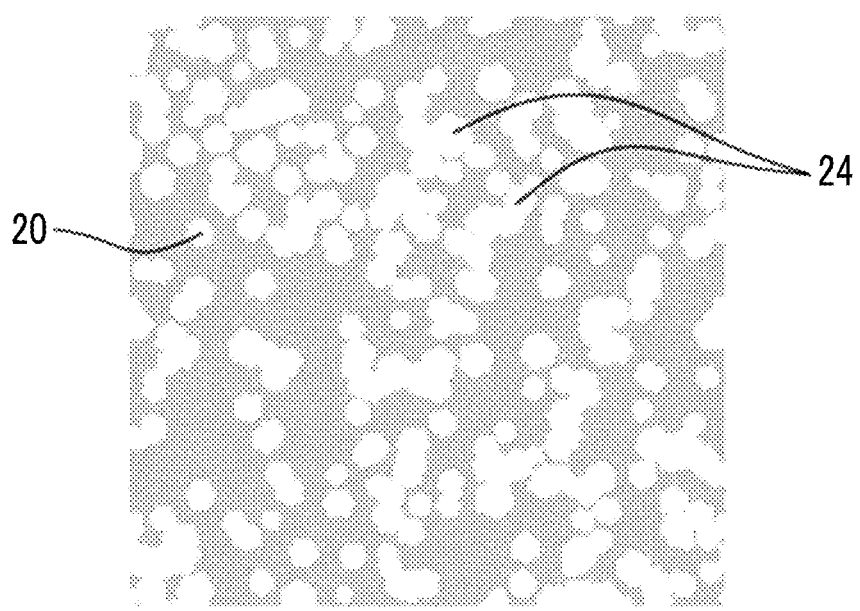
FIG. 5C is a diagram showing a state where the gold-coated flat silver particles are distributed (10% isolated) in the metal fine particle-containing layer.
Figure 5D:
FIG. 5D is a diagram showing a state where the gold-coated flat silver particles are distributed (2% isolated) in the metal fine particle-containing layer.

The state where the specific flat particles 20 are dispersed is not particularly limited as long as a conduction path is not formed by the plurality of specific flat particles. FIGS. 5A to 5D are plan views schematically showing the state where the specific flat particles 20 are dispersed in the metal fine particle-containing layer 12. White portions in the drawings represent the specific flat particles 20. In FIG. 5A, all (100%) the plurality of specific flat particles 20 are dispersed to be isolated in a plane direction. In FIG. 5B, 50% of the plurality of specific flat particles 20 are dispersed to be isolated, and the other 50% of the specific flat particles 20 are dispersed in a state 24 where particles adjacent to each other come into contact with each other to be partially connected. In FIG. 5C, only 10% of the plurality of specific flat particles 20 are present to be isolated, and the other specific flat particles 20 are dispersed in the state 24 where particles adjacent to each other come into contact with each other to be partially connected. As shown in FIG. 5A, it is most preferable that the specific flat particles 20 are isolated from each other. In a case where 10% or higher of the specific flat particles 20 are arranged to be isolated from each other, the antireflection effect can be sufficiently obtained. On the other hand, FIG. 5D shows a distribution of the specific flat particles in a case where only 2% of the plurality of specific flat particles 20 are isolated from each other. In FIG. 5D, the specific flat particles 20 are continuous from one end to another end in the image such that a conduction path 26 is formed. In a case where the conduction path 26 is formed as described above, the absorbance of the specific flat particles in a visible range increases, and the reflectivity thereof also increases. Accordingly, in the antireflection member according to the embodiment of the present disclosure, as illustrated in FIGS. 5A to 5C, at least a conduction path is not formed by the specific flat particles 20.

Regarding the determination on whether or not a conduction path is formed, in a case where specific flat particles are continuously connected from one end to another end facing thereto in a 2.5 µm×2.5 µm region observed with an SEM, it is determined that a conduction path is formed, and in a case where specific flat particles are separated halfway, it is determined that a conduction path is not formed.

~Thickness of Metal fine Particle-Containing Layer and Range where Particles are Present~

Figure 6:
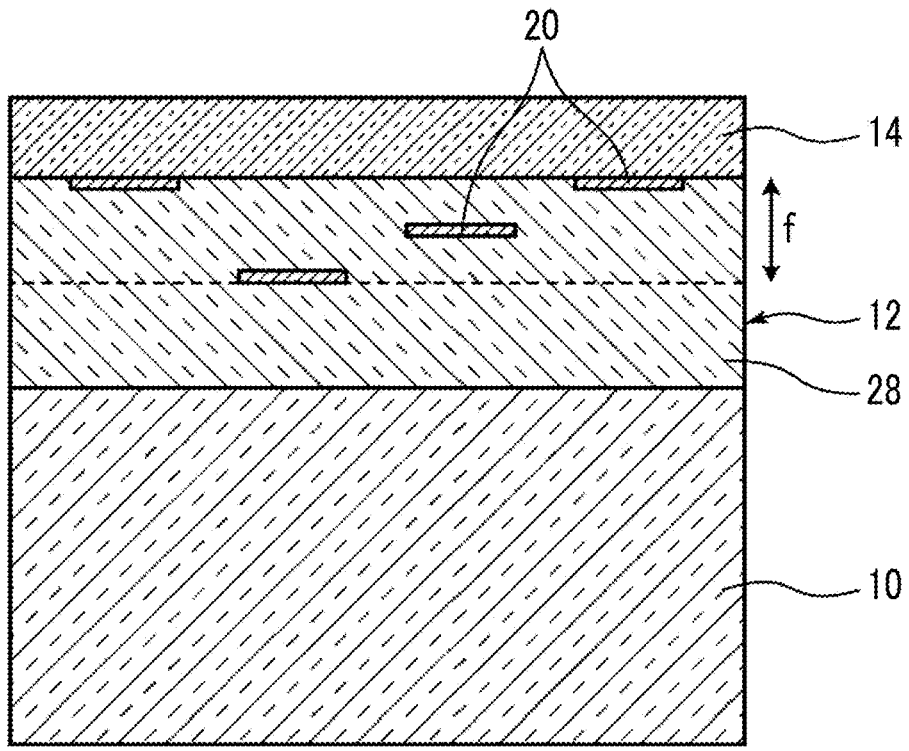
FIG. 6 is a schematic cross-sectional view showing an example of a state where the metal fine particle-containing layer including the gold-coated flat silver particles is present in the antireflection optical member according to the present disclosure.
Figure 7:
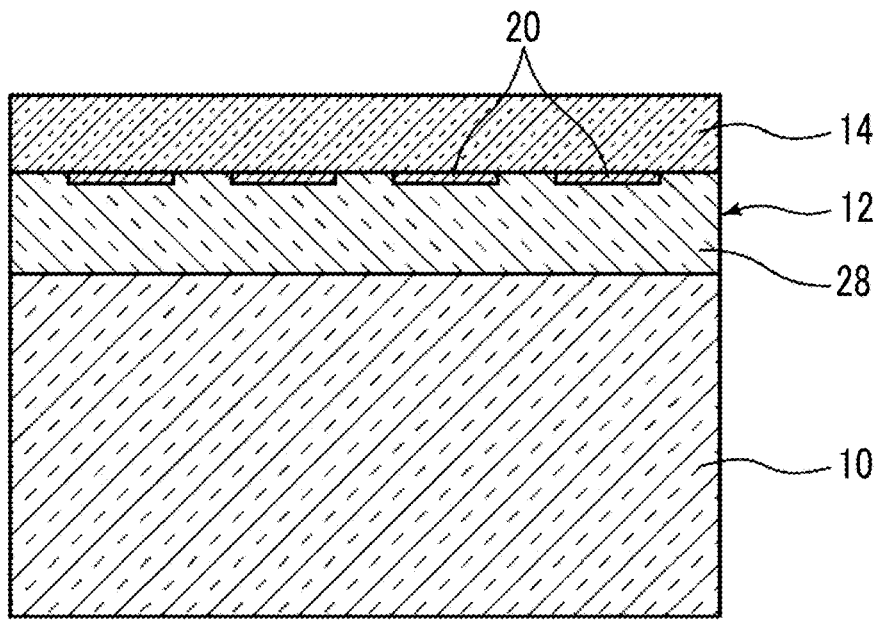
FIG. 7 is a schematic cross-sectional view showing another example of a state where the metal fine particle-containing layer including the gold-coated flat silver particles is present in the antireflection optical member according to the present disclosure.

FIGS. 6 and 7 are schematic cross-sectional views showing a state where the metal fine particle-containing layer 12 including the specific flat particles 20 is present in the antireflection optical member according to the embodiment of the present disclosure.

As the coating thickness decreases, the angle range of the alignment of the specific flat particles is likely to become close to 0°, and the absorption of visible light can be reduced. Therefore, a thickness d of the metal fine particle-containing layer 12 in the antireflection optical member according to the embodiment of the present disclosure is preferably 100 nm or less, more preferably 3 to 50 nm, and still more preferably 5 to 40 nm.

In a case where a relationship between the thickness d of the coating film of the metal fine particle-containing layer 12 and the average equivalent circle diameter D of the specific flat particles satisfies d>D/2, it is preferable that 80% by number or higher of the specific flat particles are present in a range from the surface of the metal fine particle-containing layer to d/2, it is more preferable that 80% by number or higher of the specific flat particles are present in a range from the surface of the metal particle-containing layer to d/3, and it is still more preferable that 60% by number or higher of the specific flat particles are exposed to one surface of the metal fine particle-containing layer. The specific flat particles being present in a range from the surface of the metal fine particle-containing layer to d/2 represents that at least some of the specific flat particles are present in a range from the surface of the metal fine particle-containing layer to d/2. FIG. 6 is a schematic diagram in which the thickness d of the metal fine particle-containing layer satisfies d>D/2. In FIG. 6, in particular, 80% by number of the specific flat particles are included in a range f, and f<d/2.

In addition, the specific flat particles being exposed to one surface of the metal fine particle-containing layer represents that a part of surfaces of some of the specific flat particles is positioned at an interface between the metal fine particle-containing layer and the dielectric layer. FIG. 7 is a diagram showing a case where surfaces of some of the specific flat particles match with the interface with the dielectric layer.

Here, the specific flat particle presence distribution in the metal fine particle-containing layer can be measured, for example, from an image obtained by observing a cross-section of the antireflection optical member with an SEM.

In the antireflection optical member according to the embodiment of the present disclosure, the relationship between the thickness d of the coating film of the metal fine particle-containing layer and the average equivalent circle diameter D of the specific flat particles satisfies preferably d<D/2, more preferably d<D/4, and still more preferably d<D/8. It is preferable that the coating thickness of the metal fine particle-containing layer is as small as possible because the angle range of the alignment of the specific flat particles is likely to become close to 0°, and the absorption of visible light can be reduced.

A plasmon resonance wavelength λ of the specific flat particles in the metal fine particle-containing layer is not particularly limited as long as it is longer than the predetermined wavelength at which reflection is to be prevented, and can be appropriately selected depending on the purpose. From the viewpoint of shielding heat rays or the like, the plasmon resonance wavelength λ is preferably 700 nm to 2,500 nm.

~Haze Value (Transparency)~

A haze value (%) of the metal fine particle-containing layer 12 is preferably 0.1% to 10.0%, more preferably 0.1% to 5%, and still more preferably 0.1% to 3%. The haze value is a value measured using a haze meter (NDH-5000, manufactured by Nippon Denshoku Industries Co., Ltd.).

~Area Ratio of Specific Flat Particles~

An area ratio [(Y/X)×100], which is a ratio of a total area Y of the specific flat particles to an area X of the substrate in a case where the antireflection optical member is seen from the top (total projected area X of the metal fine particle-containing layer in case of being seen from a direction perpendicular to the metal fine particle-containing layer), is preferably 5% or higher and more preferably 10% or higher and lower than 70%. In a case where the area ratio is 5% or higher, a sufficient antireflection effect can be obtained. In a case where the area ratio is lower than 70%, a conduction path is not formed, the absorption and reflection of visible light are suppressed, and a decrease in transmittance can be suppressed.

In order to obtain a low reflectivity in a wide wavelength range, it is preferable that the area ratio is set to be an optical value the thickness T of the specific flat particles and the refractive index $n_2$ of the dielectric layer. A case where all the metal fine particles are specific flat particles and the predetermined medium is air ($n_0=1$) will be discussed. For example, in a case where the thickness of the specific flat particles is 4 nm and the refractive index of the dielectric layer is 1.4, the area ratio is 40% or higher and lower than 70% and more preferably 50% or higher and lower than 65%. In addition, for example, in a case where the thickness of the specific flat particles is 8 nm and the refractive index of the dielectric layer is 1.4, the area ratio is 5% or higher and lower than 40% and more preferably 6% or higher and lower than 30%. In addition, for example, in a case where the thickness of the specific flat particles is 18 nm and the refractive index of the dielectric layer is 1.4, the area ratio is 5% or higher and lower than 30% and more preferably 5% or higher and lower than 25%.

Here, the area ratio can be measured, for example, by processing an image which is obtained by observing the antireflection optical member with an SEM or an atomic force microscope (AFM) from above.

~Arrangement of Particles~

It is preferable that the arrangement of the specific flat particles in the metal fine particle-containing layer is uniform. The uniform arrangement described herein represents that, in a case where the distance (inter-adjacent-particle distance) between one particle to another particle which is most adjacent thereto is converted into a numerical value in terms of the distance between the centers of the particles, the coefficient of variation (=standard deviation÷average value) in the inter-adjacent-particle distances of the respective particles is low. It is preferable that the coefficient of variation in the inter-adjacent-particle distances is as low as possible. The coefficient of variation is preferably 30% or lower, more preferably 20% or lower, still more preferably 10% or lower, and ideally 0%. In a case where the coefficient of variation in the inter-adjacent-particle distances is high, the sparse or dense arrangement of the specific flat particles in the metal fine particle-containing layer or the aggregation between the particles is likely to occur, and the haze tends to deteriorate. The inter-adjacent-particle distance can be measured by observing a coating surface of the metal fine particle-containing layer with an SEM or the like.

In addition, the boundary between the metal fine particle-containing layer and the dielectric layer can also be determined by observation using an SEM or the like, and the thickness d of the metal fine particle-containing layer can be determined. Even in a case where the dielectric layer is formed on the metal fine particle-containing layer using the same polymer as the polymer included in the metal fine particle-containing layer, typically, a boundary between the metal fine particle-containing layer and the dielectric layer can be determined based on an image obtained by SEM observation, and the thickness d of the metal fine particle-containing layer can be determined. In a case where the boundary is not clear, a surface of a flat particle which is most distant from the substrate can be determined as the boundary.

~Binder~

In the metal fine particle-containing layer 12, it is preferable that the binder 28 includes a polymer, and it is more preferable that the binder 28 includes a transparent polymer. Examples of the polymer include a polyvinyl acetal resin, a polyvinyl alcohol resin, a polyvinyl butyral resin, a polyacrylate resin, a polymethyl methacrylate resin, a polycarbonate resin, a polyvinyl chloride resin, a (saturated) polyester resin, a polyurethane resin, a natural polymer such as gelatin or cellulose. Among these, the main polymer is preferably a polyvinyl alcohol resin, a polyvinyl butyral resin, a polyvinyl chloride resin, a (saturated) polyester resin, or a polyurethane resin and more preferably a polyester resin or a polyurethane resin from the viewpoint of causing 80% by number or higher of the specific flat particles to be present in a range from the surface of the metal fine particle-containing layer to d/2.

From the viewpoint of imparting excellent weather fastness, it is more preferable that the polyester resin is a saturated polyester resin because the saturated polyester resin has no double bond. In addition, from the viewpoint of obtaining high hardness, durability, and heat resistance by curing with a water-soluble or water-dispersible curing agent, it is more preferable that the polymer has a hydroxyl group or a carboxyl group at a molecular terminal.

As the polymer, a commercially available product can be preferably used, and examples thereof include PLASCOAT Z-687 which is a water-soluble polyester resin manufactured by Goo Chemical Co., Ltd. In addition, in this specification, the main polymer included in the metal fine particle-containing layer represents a polymer component which accounts for 50 mass % or higher of the polymer included in the metal fine particle-containing layer.

The content of the polyester resin and the polyurethane resin is preferably 1 mass % to 10000 mass %, more preferably 10 mass % to 1000 mass %, and still more preferably 20 mass % to 500 mass % with respect to the specific flat particles included in the metal fine particle-containing layer. It is preferable that a refractive index n of the binder is preferably 1.4 to 1.7.

~Specific Organic Component~

It is preferable that the metal fine particle-containing layer 12 includes an organic component (specific organic component) in which a solubility product pKsp with silver ions is 14 or higher and a reduction potential is lower than 700 mV. The same features as described above regarding the specific particle dispersion according to the embodiment of the present disclosure is applicable to the details of the specific organic component.

~Other Additives~

The metal fine particle-containing layer 12 may include other additives, and examples thereof include an antioxidant, a surfactant, inorganic particles such as metal oxide particles, various water-soluble solvents, a sulfidation inhibitor, a corrosion inhibitor, a viscosity adjuster, and a preservative.

<Dielectric Layer>

As described above, the thickness 14a of the dielectric layer 14 is set such that the reflected light $L_{R1}$ of incidence light on the surface of the dielectric layer 14 is canceled out by interfering with the reflected light $L_{R2}$ of the incidence light L on the metal fine particle-containing layer 12. Here, "the reflected light $L_{R1}$ being canceled out by interfering with the reflected light $L_{R2}$ of the incidence light L on the metal fine particle-containing layer 12" represents the reflected light $L_{R1}$ and the reflected light $L_{R2}$ interfere with each other such that reflected light as a whole is reduced, and is not limited to a case where reflected light is completely eliminated. the dielectric layer 14 may be configured as a low refractive index layer.

The thickness 14a of the dielectric layer 14 is preferably 400 nm or less and is more preferably λ/4 or lower an optical path length, where λ represents the predetermined wavelength. In principle, it is optimal that the optical thickness of the dielectric layer 14 is λ/8 the optical path length". However, since the optimal value changes depending on conditions of the metal fine particle-containing layer in a range of λ/16 to λ/4, the optical thickness can be appropriately set depending on the layer configuration. A material for forming the dielectric layer 14 is not particularly limited as long as it has the second refractive index higher than the refractive index of the predetermined medium. For example, the dielectric layer 14 includes a binder, a matting agent, an ultraviolet absorber, an antistatic agent, and a surfactant and optionally further includes other components. The binder is not particularly limited and can be selected depending on the purpose. Examples of the binder include a thermally curable or photocurable resin such as an acrylic resin, a silicone resin, a melamine resin, a urethane resin, an alkyd resin, or a fluororesin.

~Other Layers and Other Components~

The antireflection optical member according to the embodiment of the present disclosure may include other layers than the above-described layers. Examples of the other layers include an infrared absorbing compound-containing layer, an infrared absorbing compound-containing layer, an adhesive layer, a hard coat layer, and a layer including an ultraviolet absorber. From the viewpoint of improving antireflection performance, the antireflection optical member according to the embodiment of the present disclosure may further include a high refractive index layer. From the viewpoint of shielding heat rays or the like, the antireflection optical member according to the embodiment of the present disclosure may include at least one kind of metal oxide particles.

Regarding the other layers and the other components, for example, features relating to an adhesive layer, a hard coat layer, a backcoat layer, a layer including an ultraviolet absorber, and metal oxide particles described in paragraphs "0075" to "0080" of JP2015-129909A are applicable to the antireflection optical member according to the embodiment of the present disclosure.

As one aspect of the antireflection optical member according to the embodiment of the present disclosure, by using an antireflection optical member including the metal fine particle-containing layer, the dielectric layer, a hard coat layer, and an adhesive layer as an example, a method of forming each of the layers will be described.

—1. Method of Forming Metal Fine Particle-Containing Layer—

A method of forming the metal fine particle-containing layer 12 is not particularly limited as long as the coating film according to the embodiment of the present disclosure is formed as the metal fine particle-containing layer. Examples of the method include an plane alignment method using a method, for example, a method of applying a coating solution that is prepared using the specific particle dispersion according to the embodiment of the present disclosure and the other optional components to the surface of the transparent substrate using a dip coater, a die coater, a slit coater, a bar coater, a gravure coater, or the like, a Langmuir-Blodgett film (LB film) method, a self-organization method, or a spray coating method.

In order to promote the plane alignment, a coating solution including the specific flat particles may be applied and then pass through a pressure roller such as a calender roller or a laminating roller.

—2. Method of Forming Dielectric Layer—

It is preferable that the dielectric layer 14 is formed by coating. At this time, the coating method is not particularly limited, and a well-known method can be used. For example, a method of applying a dispersion including an ultraviolet absorber using a dip coater, a die coater, a slit coater, a bar coater, a gravure coater, or the like can be used.

—3. Method of Forming Hard Coat Layer—

It is preferable that the hard coat layer is formed by coating. At this time, the coating method is not particularly limited, and a well-known method can be used. For example, a method of applying a dispersion including an ultraviolet absorber using a dip coater, a die coater, a slit coater, a bar coater, a gravure coater, or the like can be used.

4. Method of Forming Adhesive Layer—

It is preferable that the adhesive layer is formed by coating. For example, the adhesive layer can be laminated on a surface of a lower layer such as the transparent substrate, the metal fine particle-containing layer, or the ultraviolet absorbing layer. At this time, the coating method is not particularly limited, and a well-known method can be used. A pressure sensitive adhesive is applied to a peeling film and dried to prepare a film, and the pressure sensitive adhesive surface of the prepared film and a surface of the antireflection structure of the present disclosure are laminated. As a result, the adhesive layer can be laminated while maintaining the dry state. At this time, the laminating method is not particularly limited, and a well-known method can be used.

EXAMPLES

Hereinafter, one embodiment of the present invention will be further described in detail using Examples. The scope of the present invention is not limited to the following specific examples. Unless specified otherwise, "%" and "part(s)" represent "mass %" and "part(s) by mass".

[1-1] Preparation of Gold-Coated Flat Silver Particles (Specific Flat Particles) and Dispersion Including the Same Example 1

(1) Preparation of Flat Silver Particle Dispersion a

13 L of ion exchange water was weighed in a reaction vessel formed of NTKR-4 (manufactured by Nisshin Steel Co., Ltd.), 1.0 L of 10 g/L trisodium citrate (anhydride) aqueous solution was added while stirring the solution using a chamber including an agitator in which four propellers formed of NTKR-4 and four paddles formed of NTKR-4 were attached to a shaft formed of SUS316L, and then the solution was held at 35° C. Further, 0.68 L of 8.0 g/L polystyrene sulfonic acid aqueous solution to the reaction vessel, and 0.041 L of 23 g/L sodium borohydride aqueous solution which was prepared using 0.04 N sodium hydroxide aqueous solution was further added. 13 L of 0.10 g/L silver nitrate aqueous solution was added at 5.0 L/min.

Further, 1.0 L of 10 g/L trisodium citrate (anhydride) aqueous solution and 11 L of ion exchange water were added to this reaction vessel, and 0.68 L of 80 g/L hydroquinone potassium sulfonate aqueous solution was further added. The stirring rate was increased to 800 rotations per minute (rpm; hereinafter, the same shall be applied), and 8.1 L of 0.10 g/L silver nitrate aqueous solution was added at 0.95 L/min and was heated to 30° C.

Further, 8.0 L of 44 g/L methylhydroquinone aqueous solution was added to the reaction vessel, and then the total amount of gelatin aqueous solution described below at 40° C. was added. The stirring rate was increased to 1200 rpm, and the total amount of white silver sulfite precipitate mixed solution described below was added to the reaction vessel.

Once the change in the pH of the prepared solution stopped, 5.0 L of 1 mol/L NaOH aqueous solution was added to the reaction vessel at 0.33 L/min. Next, 0.18 L of 2.0 g/L 1-(m-sulfophenyl)-5-mercaptotetrazole sodium aqueous solution (in which the pH was adjusted to 7.0±1.0 using NaOH and citric acid (anhydride)) was added to the reaction vessel, and 0.078 L of 70 g/L 1,2-benzisothiazolin-3-one (in which the aqueous solution was adjusted to be alkaline using NaOH) was further added. This way, a flat silver particle dispersion a was prepared. In the flat silver particles included in the flat silver particle dispersion a, the average thickness was 8.3 nm, the average particle size (average equivalent circle diameter) was 121.2 nm, and the aspect ratio was 14.6. The measurement methods are as described above.

~Preparation of Gelatin Aqueous Solution~16.7 L of ion exchange water was weighed in a solution tank formed of SUS316L. 1.4 kg of alkali-treated bovine bone gelatin (gel permeation chromatography (GPC) weight-average molecular weight: 200000) having undergone a deionization treatment was added while stirring the solution using an agitator formed of SUS316L at a low rate. Further, 0.91 kg of alkali-treated bovine bone gelatin (GPC weight-average molecular weight: 21000) having undergone a deionization treatment, a proteolytic enzyme treatment, and an oxidation treatment using hydrogen peroxide was added to the solution tank. Next, the solution was heated to 40° C., and gelatin was simultaneously swollen and dissolved to be completely dissolved.

~Preparation of White Silver Sulfite Precipitate Mixed Solution~

8.2 L of ion exchange water was weighed in a solution tank formed of SUS316L, and 8.2 L of 100 g/L silver nitrate aqueous solution was added. 2.7 L of 140 g/L sodium sulfite aqueous solution was added to the solution tank within a short period of time while stirring the solution using an agitator formed of SUS316L at a high rate. As a result, a mixed solution including a white silver sulfite precipitate was prepared. The white silver sulfite precipitate mixed solution was prepared immediately before use.

(2) Addition of Edge Surface Adsorbent

Next, 13.6 g of 50 mM hexadecyltrimethylammonium chloride (CTAC) was added to 130.4 g of the flat silver particle dispersion a obtained as described above. As a result, a flat silver particle dispersion A was obtained.

(3) Gold Coating Process (Preparation of Dispersion Including Specific Flat Particles)

266.3 g of water, 177 g of 0.5 mol/L ascorbic acid (reducing agent), and 608 g of the following gold reduction solution B1 were sequentially added to a reaction vessel and were stirred for 5 minutes. Next, the pH of the solution was adjusted to be 10 or higher using 1 mol/L sodium hydroxide aqueous solution. As a result, a gold coating solution B1 was obtained. Next, 144 g of the flat silver particle dispersion A (silver concentration: 0.5 mass %≈46 mmol/L) was added to the gold coating solution B1 in the reaction vessel, and the solution was stirred at 60° C. for 4 hours. As a result, a dispersion (dispersion b) including specific flat particles obtained by coating the flat silver particles with gold was obtained.

~Preparation of Gold Reduction Solution~

18.2 g of water, 353.6 g of 0.012 mol/L hydrogen tetrachloroaurate (water-soluble gold compound), 15.6 g of 0.2 mol/L sodium hydroxide (pH adjuster), and 220.6 g of 0.1 mol/L sodium thiosulfate (complexing agent) were sequentially added to a vessel while slightly stirring the components. As a result, a gold reduction solution B1 was obtained.

(4) Desalting Process and Redispersing Process 800 g of the dispersion b including the specific flat particles obtained as described above was collected in a centrifuge tube, and the pH thereof was adjusted to 9.2±0.2 at 25° C. using at least one of 1 mol/L NaOH or 0.5 mol/L sulfuric acid. Using a centrifugal separator (himac CR22G III, manufactured by Hitachi Koki Co., Ltd., angle rotor R9A), the solution was centrifugally separated at 9000 rpm at 35° C. for 60 minutes, and 784 g of the supernatant was thrown away. 0.2 mmol/L NaOH aqueous solution was added to precipitated flat silver particles and was manually stirred using a stirring rod to prepare 400 g in total of a coarse dispersion. By performing the same operation as described above, 9600 g in total of 24 coarse dispersions were prepared, were added to a tank formed of SUS316L, and were mixed with each other. Further, 10 mL of 10 g/L solution (diluted with a mixed solution of methanol:ion exchange water=1:1 (volume ratio)) of Pluronic 31R1 (manufactured by BASF SE) as a surfactant was added to the tank. Using AUTO MIXER 20 (manufactured by Primix Corporation; a stirring portion was a homogenizer MARK II), the mixture of the coarse dispersion and the surfactant in the tank was dispersed in a batch process at 9000 rpm for 120 minutes. During dispersing, the liquid temperature was held at 50° C. After dispersing, the dispersion was cooled to 25° C. and was filtered in a single pass using a Profile II filter (Product Model: MCY1001Y030H13, manufactured by Pall Corporation). This way, by desalting and redispersing the dispersion b including the specific flat particles, a dispersion B1 as a finished product including the specific flat particles was obtained. In the specific flat particles included in the dispersion B1, the average thickness was 9.1 nm, the average particle size (average equivalent circle diameter) was 123.2 nm, the aspect ratio was 13.5, and coefficient of variation was 19.6%. The measurement methods are as described above.

Examples 2 to 14 and Comparative Examples 5 and 6

Dispersions B2 to B14 and dispersions C5 and C6 were obtained using the same method as that of Example 1, except that the kind and amount of the complexing agent, the amount of the edge surface adsorbent, the silver concentration, and the gold concentration were adjusted as shown in the following Table 2 by adjusting the kind and amount of the complexing agent, the amount of the edge surface adsorbent, the amount of the flat silver particle dispersion A, and the amount of hydrogen tetrachloroaurate.

Example 15

A dispersion B15 was obtained using the same method as that of Example 4, except that the addition amount of 100 g/L silver nitrate aqueous solution during the preparation of the white silver sulfite precipitate mixed solution added for the precipitation of the flat silver particle dispersion a was changed to 2.7 L, and the kind and amount of the complexing agent, the amount of the edge surface adsorbent, the silver concentration, and the gold concentration were adjusted as shown in the following Table 2 by adjusting the kind and amount of the complexing agent, the amount of the edge surface adsorbent, the amount of the flat silver particle dispersion A, and the amount of hydrogen tetrachloroaurate.

Example 16

A dispersion B16 was obtained using the same method as that of Example 4, except that 33.1 L of the solution was removed from the solution in the reaction vessel before adding the methylhydroquinone aqueous solution for the precipitation of the flat silver particle dispersion a.

Example 17

A dispersion B17 was obtained using the same method as that of Example 4, except that 136.3 g of water and 130 g of 5 mass % glycine aqueous solution as a pH buffer agent were used instead of 266.3 g of water during the preparation of the gold coating solution.

Example 18

A dispersion B18 was obtained using the same method as that of Example 4, except that the following micromixer was used during the mixing of the flat silver particle dispersion and the gold coating solution. Specifically, the flat silver particle dispersion and the gold coating solution were fed using a plunger pump (manufactured by Fuji Techno Industries Corporation) at 8 mL/min and 32 mL/min, respectively, and were mixed with each other using a T-shaped reactor (inner diameter: 0.5 mm) (manufactured by Tokyo Rikakikai Co., Ltd.). The plunger pump and the reactor were connected through a Teflon (registered trade name) tube having a length 500 mm and an inner diameter of 2 mm, and the reactor and a receiving vessel were connected through a Teflon (registered trade name) tube having a length 200 mm and an inner diameter of 2 mm. In addition, the reactor was heated to 60° C. using a water bath. The collected solution was stirred at 60° C. for 4 hours.

Comparative Example 1

Using a method described in paragraphs "0032" and "0033" of JP2016-109550A, the addition amount of each of the materials was 260 times to prepare the flat silver particles such that the silver concentration was 46 mmol/L that was the same as the flat silver particle dispersion a. However, a precipitate was formed, and the flat silver particles were not able to be prepared. The reason for the result was presumed to be that, since the silver concentration was high, protective colloid properties of particles were not able to be sufficiently exhibited with a dispersion force of sodium citrate. Therefore, in Comparative Example 1, the gold coating process was not able to be performed.

Comparative Example 2

Flat silver particles were prepared using the same method as that of Example 1, except that the same process as "(4) Desalting Process and Redispersing Process" was performed without performing the addition of edge surface adsorbent and the gold coating process on the flat silver particle dispersion a prepared in Example 1. A dispersion of the prepared flat silver particles was used as a dispersion C2.

Comparative Example 3

A dispersion C3 as the gold-coated flat silver particle dispersion was obtained using the same method as that of Example 1, except that the complexing agent was not used.

Comparative Example 4

A dispersion C4 as the gold-coated flat silver particle dispersion was obtained using the same method as that of Example 1, except that the complexing agent was changed to potassium iodide.

Regarding the dispersions B1 to B18 and the dispersions C1 to C6 obtained as described above, the kind of the complexing agent used for the gold coating process, the reduction potential (V) of the complex formed using the complexing agent and gold, the amount (mmol/L) in the dispersion, the silver concentration (mmol/L) in the dispersion, and the gold concentration (mmol/L) in the dispersion are shown in Table 2. The kind of the complexing agent "–(C1)" shown in Comparative Example 3 represents a ligand derived from hydrogen tetrachloroaurate.

[1-2] Measurement and Evaluation (I)

(1) Check of Gold Coating State

The gold-coated flat silver particles included in the dispersions B1 to B18 and the dispersions C1 to C6 were checked using a scanning electron microscope (SEM, ultra-high resolution field emission scanning electron microscope: S-5200, manufactured by Hitachi High-Technologies Corporation). The results are shown in Table 2.

Figure 8A:
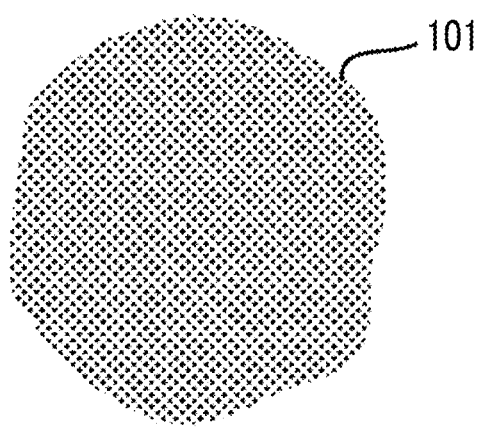
FIGS. 8A to 8C are diagrams showing a state where a gold coating layer is formed in a gold-coated flat silver particle obtained in Example 7.
Figure 8B:
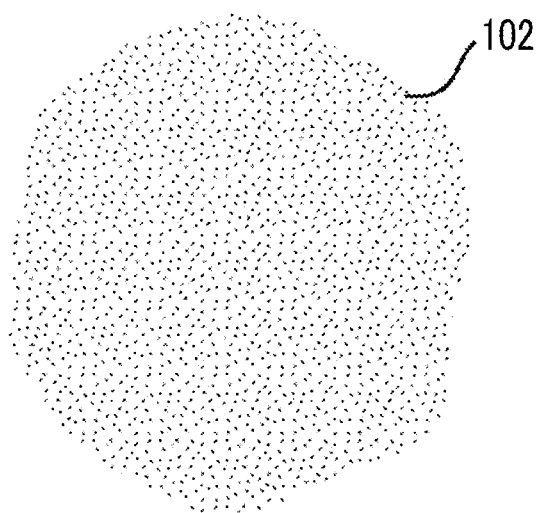
Figure 8C:
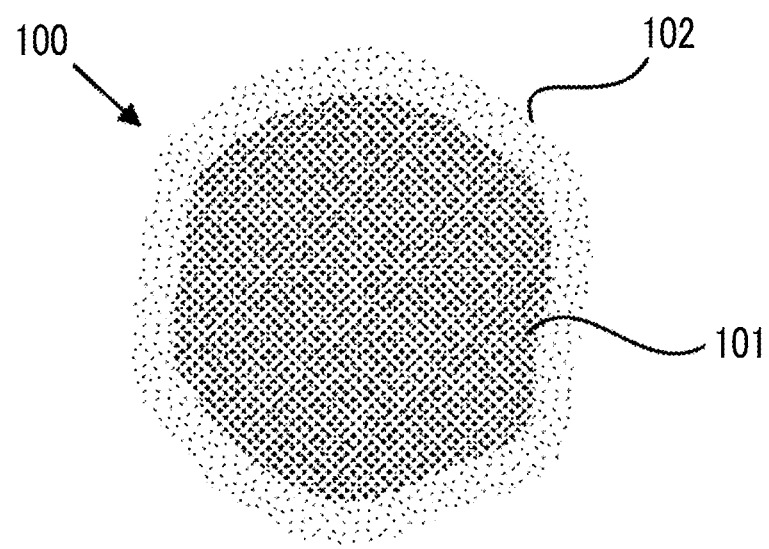

In addition, FIGS. 8A to 8C are diagrams showing a state where the flat gold coating layer is formed in the gold-coated flat silver particle obtained in Example 7. FIGS. 8A to 8C are diagrams prepared based on the measurement result of energy dispersive X-ray spectrometry (EDS) on the gold-coated flat silver particle obtained in Example 7. FIG. 8A shows the flat silver particle 101 alone, FIG. 8B shows the gold coating layer 102 alone, and FIG. 8C shows the gold-coated flat silver particle 100 in which the gold coating layer 102 is present on the entire surface of the flat silver particle 101.

The gold coating states of other gold-coated flat silver particles in which the result of checking the gold coating state was "flat" were the same as that of the gold-coated flat silver particles obtained in Example 7.

(2) Measurement of Average Thickness and Thickness Ratio of Gold Coating Layer

Regarding the gold-coated flat silver particles obtained in the dispersions B1 to B18 and the dispersions C1 to C6, the average thickness (A) on the principal planes and the average thickness (B) on the edge surfaces were measured, and the thickness ratio (A/B) was calculated. The details of the method of measuring the thickness are as follows. The results are shown in Table 1.

(Measurement Method)

A high-angle annular dark field scanning TEM (HAADF-STEM) image in a particle cross-sectional direction was obtained, the thickness of the gold coating layer having a high brightness at five points of one particle in each of principal planes and an edge surface of the particle of the obtained image was measured using ImageJ as an image analysis tool, and the average value of the thicknesses of 20 particles in total was obtained. As a result, the average thickness (A) on the principal planes, the average thickness (B) on the edge surfaces, and the thickness ratio A/B was calculated.

(3) Oxidative Resistance ($H_2O_2$ Resistance) Evaluation

The oxidative resistance ($H_2O_2$ resistance) of the dispersions B1 to B18 and the dispersions C1 to C6 was evaluated based on the following evaluation method and the following evaluation standards. The evaluation level A or B represents that the oxidative resistance has no problem in practice. The results are shown in Table 2.

(Evaluation Method)

Each of the solution in which the $H_2O_2$ content was 0 mass % and the solution in which the $H_2O_2$ content was 3 mass % was divided into 19 solutions of 4 mL, and 20 μL of each of the dispersions B1 to B18 and the dispersions C1 to C6 was added thereto to prepare an evaluation sample. Each of the evaluation samples was left to stand for 2 hours, and the liquid spectral characteristics of each of the evaluation samples were measured using a spectrophotometer (U-4000, manufactured by Hitachi High-Technologies Corporation). Regarding each of the dispersions B1 to B13 and the dispersions C1 to C6, the absorption peak intensity, AM (Abs. Max) (0%), and AM (3%) of the evaluation sample in which the $H_2O_2$ content was 0 mass % and the evaluation sample in which the $H_2O_2$ content was 3 mass % were obtained. The oxidative resistance ($H_2O_2$ resistance) was determined based on the evaluation standards A to E from the intensity ratio: AM (3%)/AM (0%).

(Evaluation Standards)

A: the intensity ratio was 0.9 to 1.0
B: the intensity ratio was 0.7 or higher and lower than 0.9
C: the intensity ratio was 0.5 or higher and lower than 0.7
D: the intensity ratio was 0.3 or higher and lower than 0.5
E: the intensity ratio was 0 or higher and lower than 0.3

3. Evaluation of Particle Productivity

Regarding each of the obtained dispersions, by dividing the silver concentration (mmol/L) by the preparation time (hr) of the dispersion, the productivity (mmol/L·hr) of the particles was obtained. The evaluation standards are as follows. As the evaluation becomes higher, a dispersion including the high-concentration gold-coated flat silver particles can be obtained within a short period of time, and the productivity is high. The results are shown in Table 2.

(Evaluation Standards)

A: the productivity was 2.5 mmol/L·hr or higher
B: the productivity was 0.5 mmol/L·hr or higher and lower than 2.5 mmol/L·hr
C: the productivity was lower than 0.5 mmol/L·hr

TABLE 2

| | Dispersion No. | Complexing Agent Kind | Reduction Potential [V] | Addition Amount [mmol/L] | Edge Surface Adsorbent Kind | Addition Amount [mmol/L] | Ag Concentration [mmol/L] | Au Concentration [mmol/L] |
|---|---|---|---|---|---|---|---|---|
| Comparative Example 1 | C1 | — | 1.00 | — | — | — | 4.5 | — |
| Comparative Example 2 | C2 | — | — | — | — | — | 4.5 | — |
| Comparative Example 3 | C3 | —(Cl) | 1.00 | — | — | — | 4.5 | 2.88 |
| Comparative Example 4 | C4 | KI | 0.56 | 15 | CTAC | 0.46 | 4.5 | 2.88 |
| Example 1 | B1 | $Na_2S_2O_3$ | 0.15 | 15 | CTAC | 0.46 | 4.5 | 2.88 |
| Example 2 | B2 | $NaSO_3$ | 0.11 | 2 | CTAC | 0.01 | 0.1 | 0.06 |
| Example 3 | B3 | $NaSO_3$ | 0.11 | 15 | CTAC | 0.46 | 4.5 | 2.88 |
| Example 4 | B4 | $NaSO_3$ | 0.11 | 60 | CTAC | 1.84 | 18 | 11.52 |
| Example 5 | B5 | $NaSO_3$ | 0.11 | 7.5 | CTAC | 0.46 | 4.5 | 2.88 |
| Example 6 | B6 | $NaSO_3$ | 0.11 | 30 | CTAC | 0.46 | 4.5 | 2.88 |
| Example 7 | B7 | $NaSO_3$ | 0.11 | 15 | CTAC | 0 | 4.5 | 2.88 |
| Example 8 | B8 | $NaSO_3$ | 0.11 | 15 | CTAC | 0.2 | 4.5 | 2.88 |
| Example 9 | B9 | $NaSO_3$ | 0.11 | 15 | CTAC | 1.38 | 4.5 | 2.88 |
| Comparative Example 5 | C5 | $NaSO_3$ | 0.11 | 15 | CTAC | 0 | 4.5 | 2.88 |
| Comparative Example 6 | C6 | $NaSO_3$ | 0.11 | 15 | CTAC | 0.05 | 4.5 | 2.88 |
| Example 10 | B10 | $NaSO_3$ | 0.11 | 15 | CTAC | 0.2 | 4.5 | 2.88 |
| Example 11 | B11 | $NaSO_3$ | 0.11 | 15 | CTAC | 1.38 | 4.5 | 2.88 |
| Example 12 | B12 | $NaSO_3$ | 0.11 | 30 | CTAC | 0.46 | 4.5 | 5.76 |
| Example 13 | B13 | $NaSO_3$ | 0.11 | 45 | CTAC | 0.46 | 4.5 | 8.64 |
| Example 14 | B14 | $NaSO_3$ | 0.11 | 60 | CTAC | 1.84 | 18 | 2.88 |
| Example 15 | B15 | $NaSO_3$ | 0.11 | 60 | CTAC | 1.84 | 18 | 11.52 |
| Example 16 | B16 | $NaSO_3$ | 0.11 | 60 | CTAC | 1.84 | 18 | 11.52 |
| Example 17 | B17 | $NaSO_3$ | 0.11 | 60 | CTAC | 1.84 | 18 | 11.52 |
| Example 18 | B18 | $NaSO_3$ | 0.11 | 60 | CTAC | 1.84 | 18 | 11.52 |

| | Shape of Particle | | | | | | |
|---|---|---|---|---|---|---|---|
| | Gold Coating Layer | | | | | Oxidative | |
| | Principal Plane Thickness (A) [nm] | Edge Surface Thickness (B) [nm] | Thickness Ratio [A/B] | Aspect Ratio | Gold Coating State [SEM Image] | Resistance ($H_2O_2$ Resistance) | Particle Productivity |
| Comparative Example 1 | Flat Silver Particles Not Able to be Prepared and Measurement and Evaluation Not Measurable | | | | | | B |
| Comparative Example 2 | Gold Coating Process Not Performed | | | 14.6 | — | E | B |

TABLE 2-continued

| | | | | | | | |
|---|---|---|---|---|---|---|---|
| Comparative Example 3 | Not Measurable | | | | Particulate | E | B |
| Comparative Example 4 | Not Measurable | | | | Particulate | D | B |
| Example 1 | 0.4 | 1.0 | 0.4 | 13.5 | Uneven | B | B |
| Example 2 | 1.0 | 0.8 | 1.3 | 12.0 | Flat | A | C |
| Example 3 | 1.0 | 1.4 | 0.7 | 12.1 | Flat | A | B |
| Example 4 | 0.8 | 2.5 | 0.3 | 12.6 | Flat | A | A |
| Example 5 | 0.6 | 1.0 | 0.6 | 13.1 | Flat (Slightly Particulate) | B | B |
| Example 6 | 0.4 | 0.8 | 0.5 | 13.4 | Flat | B | B |
| Example 7 | 0.6 | 4.2 | 0.1 | 13.8 | Flat | B | B |
| Example 8 | 0.7 | 2.4 | 0.3 | 13.0 | Flat | A | B |
| Example 9 | 1.1 | 0.7 | 1.6 | 11.6 | Flat | A | B |
| Comparative Example 5 | 0.0 | 11.3 | 0.000 | 17.3 | Flat | D | B |
| Comparative Example 6 | 0.1 | 10.1 | 0.010 | 16.5 | Flat | C | B |
| Example 10 | 0.4 | 4.9 | 0.1 | 14.3 | Flat | B | B |
| Example 11 | 1.0 | 1.0 | 1.0 | 12.0 | Flat | A | B |
| Example 12 | 2.0 | 1.4 | 1.4 | 10.1 | Flat | A | B |
| Example 13 | 3.1 | 1.7 | 1.8 | 8.6 | Flat | A | B |
| Example 14 | 0.1 | 1.1 | 0.1 | 14.5 | Flat | B | A |
| Example 15 | 0.7 | 1.5 | 0.5 | 3.6 | Flat | A | A |
| Example 16 | 0.6 | 2.6 | 0.2 | 29.4 | Flat | A | A |
| Example 17 | 0.9 | 1.8 | 0.5 | 12.4 | Flat | A | A |
| Example 18 | 1.0 | 1.9 | 0.5 | 12.1 | Flat | A | A |

As shown in Table 2, it was found that, in the specific flat particles included in each of the dispersions B1 to B18 according to Examples 1 to 18, the average thickness of the gold coating layer on principal planes of the particles was 0.1 nm to 2 nm, and the ratio (AB) of the average thickness (A) of the gold coating layer on the principal planes of the particles to the average thickness (B) of the gold coating layer on the edge surfaces of the particles was 0.02 or higher. It can be seen that the dispersions exhibit excellent oxidative resistance ($H_2O_2$ resistance).

Further, it can be seen from Table 2 that the specific flat particles having excellent oxidative resistance can be manufactured with high productivity by increasing the silver concentration (for example, refer to Examples 2 to 4), and the manufacturing method according to the embodiment of the present disclosure is a manufacturing method capable of achieving oxidative resistance ($H_2O_2$ resistance) and particle productivity.

[2-1] Preparation of Coating Film

Example 19

<Preparation of Coating Solution B1>
With a composition 1 shown in the following Table 3, a coating solution B1 was prepared.

TABLE 3

| (Composition 1) | |
|---|---|
| Polyurethane aqueous solution: Hydran HW-350 (manufactured by DIC Corporation, concentration of solid contents: 30%) | 0.27 Parts |
| Surfactant A: F Lipal 8780P (manufactured by Lion Corporation, concentration of solid contents: 1%) | 0.98 Parts |
| Surfactant B: Naroacty CL-95 (manufactured by SANYO KASEI Co. Ltd., concentration of solid contents: 1%) | 1.21 Parts |
| Surfactant C Sodium = 1.2-{bis(3,3,4,4,5,5,6,6,6-nonafluorohexycarbonyl)}ethanesulfonate, concentration of solid contents: 2%) | 1.02 Parts |
| Gold-coated flat silver particle dispersion B1 | 11.49 Parts |
| 1-(5-methylureidophenyl)-5-mercaptotetrazole (manufactured by Wako Pure Chemical Co., Ltd, concentration of solid contents: 2%, specific organic component 1) | 0.62 Parts |
| Water | 53.89 Parts |
| Methanol | 30.53 Parts |

<Formation of Coating Film>
The coating solution B1 was applied to a surface of a polyethylene terephthalate (PET) film (U403, thickness: 75 μm, manufactured by Toray Industries Inc.) with an easily adhesive layer as a transparent substrate using a wire bar such that the average thickness of the dried coating film was 30 nm. Next, the applied solution was heated at 130° C. for 1 minute, dried, and solidified to form a coating film B1.

Examples 20 to 31 and 36 to 38, and Comparative Examples 7 to 12

Each of coating solutions B2 to B13 and B14 to B16 and coating solutions C1 to C6 was prepared using the same method as that of Example 19, except that any one of the dispersions B2 to B14 and B17 and B18 and the dispersions C1 to C6 was used instead of the dispersion B1. Next, coating films B1 to B13 and B18 to B20 and coating films C1 to C6 were formed the same method as that of Example 19, except that the obtained respective coating solutions were used.

Example 32

A coating solution B14 was prepared using the same method as that of Example 19, except that the dispersion B3 was used instead of the dispersion B1 and the specific organic component 1 was used. Next, a coating film B14 was formed using the same method as that of Example 19, except that the obtained coating solution was used.

Examples 33 to 35

Each of coating solutions B15 to B17 was prepared using the same method as that of Example 19, except that any one of organic components 2 to 4 shown in the following Table 4 was added instead of the specific organic component 1 (1-(5-methylureidophenyl)-5-mercaptotetrazole). Next, coating films B15 to B17 were formed using the same method as that of Example 19, except that the obtained respective coating solutions were used.

[2-2] Measurement and Evaluation (II)

Regarding the prepared coating film, the following measurement and evaluation were performed.

(1) Measurement of Reduction Potential Value (mV) of Organic Component

The reduction potential values (mV) of the specific organic component 1 and the organic components 2 to 4 were measured with reference to cyclic voltammetry described in "Electrochemical Measurement" (1984, Akira, Fujishima et al), pp. 150-167. The measured values are shown in Table 4.

(2) Measurement of pKsp Value of Organic Component

The solubility products pKsp of the specific organic component 1 and the organic components 2 to 4 with silver ions were measured with reference to "Journal of the Society of Photography and Imaging of Japan, 13, 126, (1951)" and "A. Pailliofet and J. Pouradier, Bull. Soc. chim. France, 1982, 1-445 (1982)". pKsp=$-\log_{10}$ Ksp. The measured values are shown in Table 4.

(3) Oxidative Resistance (Ozone Fastness) Evaluation

The oxidative resistance (ozone fastness) of the coating films B1 to B20 and the coating films C1 to C6 was evaluated based on the following evaluation method and the following evaluation standards. The evaluation level A or B represents that the oxidative resistance has no problem in practice. The results are shown in Table 4.

(Evaluation Method)

Each of the coating films formed in Examples and Comparative Examples was bonded to a blue plate glass having a thickness of 3 mm through an adhesive film (PD-S1: manufactured by Panac Corporation) such that the transparent substrate was arranged on the blue plate glass side. This way, two sets of samples were prepared. Regarding the coating film of one set of sample among the samples, the average reflectance (before an exposure test) was calculated using the following method of measuring the surface reflectance. Here, black ink was applied to a surface of the blue plate glass opposite to the surface to which the coating film was bonded, and the reflectivity was measured.

—Method of Measuring Surface Reflectance—

Regarding each of the coating films according to Examples and Comparative Examples, black ink (Artline_KR-20_black, manufactured by Shachihata Inc.) was applied to a surface (back surface of the transparent substrate) opposite to the surface to which the coating film was bonded, and in a case where light was incident from the coating film side at an incidence angle of 5°, specular reflection other than reflection in a visible range on the back surface was measured using a UV-VIS-NIR spectrophotometer (V560, manufactured by JASCO Corporation).

The other set of the sample was exposed to an environment of 40° C., 80% RH, and ozone concentration: 10 ppm in a corrosion tester GS-FD (manufactured by Suga Test Instruments Co., Ltd.) for 120 hours. Regarding the exposed antireflection film of each of the samples, the average reflectance (after the exposure test) was calculated by performing the measurement of the surface reflectance using the above-described method. A difference between the average reflectance before the exposure test and the average reflectance after the exposure test obtained as described above was obtained and was evaluated based on the following standards. The results are shown in Table 4.

(Evaluation Standards)
A: the difference was 0.2% or lower
B: the difference was higher 0.2% and 0.4% or lower
C: the difference was higher 0.4% and 0.6% or lower
D: the difference was higher 0.6% and 1.0% or lower
E: the difference was higher than 2.0%

(4) Measurement of Haze Value (%)

The haze value of each of the coating films B1 to B20 and the coating films C1 to C6 was measured using a haze meter (NDH-5000, manufactured by Nippon Denshoku Industries Co., Ltd.). For use in the antireflection optical member, the haze value (%) is preferably 0.1% to 3%.

(5) Measurement of Plane Alignment (°)

The plane alignment (°) was measured using the above-described method. The measurement method is as follows. The results are shown in Table 4. In a case where the antireflection optical member according to the embodiment of the present disclosure is configured, the principal planes of the specific flat particles are aligned in a range of 0° to 30° with respect to the surface of the coating film (metal fine particle-containing layer).

(Measurement Conditions)

Regarding each of the coating films according to Examples and Comparative Examples, a cross-section sample was prepared using focused ion beams (Nova 200 FIB-SEM, manufactured by Thermo Fisher Scientific). Each of the obtained cross-section samples was observed using an HD 2300 STEM machine (manufactured by Hitachi High-Technologies Corporation) to obtain an image. Using the obtained image, 0° was determined from a boundary between the transparent substrate and the coating film, and the average of plane alignment angles of 30 particles in total was obtained as the value (°) of plane alignment.

TABLE 4

| | | | Particle Dispersion Used | | | | | |
|---|---|---|---|---|---|---|---|---|
| | | | Complexing Agent | | | Edge Surface Adsorbent | | Ag | Au |
| | Coating Film No. | Coating Solution No. | Kind | Reduction Potential [V] | Addition Amount [mmol/L] | Kind | Addition Amount [mmol/L] | Concentration [mmol/L] | Concentration [mmol/L] |
| Comparative Example 7 | C1 | C1 | — | 1.00 | — | — | — | 4.5 | — |
| Comparative Example 8 | C2 | C2 | — | — | — | — | — | 4.5 | — |
| Comparative Example 9 | C3 | C3 | —(Cl) | 1.00 | — | — | — | 4.5 | 2.88 |

TABLE 4-continued

| | | | | | | | | | |
|---|---|---|---|---|---|---|---|---|---|
| Comparative Example 10 | C4 | C4 | KI | 0.56 | 15 | CTAC | 0.46 | 4.5 | 2.88 |
| Example 19 | B1 | B1 | Na₂S₂O₃ | 0.15 | 15 | CTAC | 0.46 | 4.5 | 2.88 |
| Example 20 | B2 | B2 | NaSO₃ | 0.11 | 2 | CTAC | 0.01 | 0.1 | 0.06 |
| Example 21 | B3 | B3 | NaSO₃ | 0.11 | 15 | CTAC | 0.46 | 4.5 | 2.88 |
| Example 22 | B4 | B4 | NaSO₃ | 0.11 | 60 | CTAC | 1.84 | 18 | 11.52 |
| Example 23 | B5 | B5 | NaSO₃ | 0.11 | 7.5 | CTAC | 0.46 | 4.5 | 2.88 |
| Example 24 | B6 | B6 | NaSO₃ | 0.11 | 30 | CTAC | 0.46 | 4.5 | 2.88 |
| Example 25 | B7 | B7 | NaSO₃ | 0.11 | 15 | CTAC | 0 | 4.5 | 2.88 |
| Example 26 | B8 | B8 | NaSO₃ | 0.11 | 15 | CTAC | 0.2 | 4.5 | 2.88 |
| Example 27 | B9 | B9 | NaSO₃ | 0.11 | 15 | CTAC | 1.38 | 4.5 | 2.88 |
| Comparative Example 11 | C5 | C5 | NaSO₃ | 0.11 | 15 | CTAC | 0 | 4.5 | 2.88 |
| Comparative Example 12 | C6 | C6 | NaSO₃ | 0.11 | 15 | CTAC | 0.05 | 4.5 | 2.88 |
| Example 28 | B10 | B10 | NaSO₃ | 0.11 | 15 | CTAC | 0.2 | 4.5 | 2.88 |
| Example 29 | B11 | B11 | NaSO₃ | 0.11 | 15 | CTAC | 1.38 | 4.5 | 2.88 |
| Example 30 | B12 | B12 | NaSO₃ | 0.11 | 30 | CTAC | 0.46 | 4.5 | 5.76 |
| Example 31 | B13 | B13 | NaSO₃ | 0.11 | 45 | CTAC | 0.46 | 4.5 | 8.64 |
| Example 32 | B14 | B3 | NaSO₃ | 0.11 | 30 | CTAC | 0.46 | 4.5 | 2.88 |
| Example 33 | B15 | B3 | NaSO₃ | 0.11 | 30 | CTAC | 0.46 | 4.5 | 2.88 |
| Example 34 | B16 | B3 | NaSO₃ | 0.11 | 30 | CTAC | 0.46 | 4.5 | 2.88 |
| Example 35 | B17 | B3 | NaSO₃ | 0.11 | 30 | CTAC | 0.46 | 4.5 | 2.88 |
| Example 36 | B18 | B14 | NaSO₃ | 0.11 | 60 | CTAC | 1.84 | 18 | 2.88 |
| Example 37 | B19 | B15 | NaSO₃ | 0.11 | 60 | CTAC | 1.84 | 18 | 11.52 |
| Example 38 | B20 | B16 | NaSO₃ | 0.11 | 60 | CTAC | 1.84 | 18 | 11.52 |

| | Organic Component | | | Shape of Particles in Dispersion Gold Coating Layer | | | Characteristics of Coating Film | | Oxidative Resistance (Ozone Fastness) |
|---|---|---|---|---|---|---|---|---|---|
| | Kind | pKsp | Reduction Potential [mV] | Principal Plane Thickness (A) [nm] | Edge Surface Thickness (B) [nm] | Thickness Ratio [a/b] | Haze Value [%] | Plane Alignment [°] | |
| Comparative Example 7 | Specific Organic Component 1 | 14.5 | 550 | Flat Silver Particles Not Able to be Prepared, and Measurement and Evaluation Not Measurable | | | | | |
| Comparative Example 8 | Specific Organic Component 1 | 14.5 | 550 | Gold Coating Process Not Performed | | | 0.9 | 3.1 | E |
| Comparative Example 9 | Specific Organic Component 1 | 14.5 | 550 | Not Measurable | | | 4 | 4.7 | E |
| Comparative Example 10 | Specific Organic Component 1 | 14.5 | 550 | Not Measurable | | | 2.7 | 4.3 | D |
| Example 19 | Specific Organic Component 1 | 14.5 | 550 | 0.4 | 1.0 | 0.4 | 1.2 | 3.6 | B |
| Example 20 | Specific Organic Component 1 | 14.5 | 550 | 1.0 | 0.8 | 1.3 | 1.4 | 3.4 | A |
| Example 21 | Specific Organic Component 1 | 14.5 | 550 | 1.0 | 1.4 | 0.7 | 1.4 | 3.8 | A |
| Example 22 | Specific Organic Component 1 | 14.5 | 550 | 0.8 | 2.5 | 0.3 | 1.3 | 3.4 | A |
| Example 23 | Specific Organic Component 1 | 14.5 | 550 | 0.6 | 1.0 | 0.6 | 1.7 | 3.7 | B |
| Example 24 | Specific Organic Component 1 | 14.5 | 550 | 0.4 | 0.8 | 0.5 | 1.6 | 3.8 | B |
| Example 25 | Specific Organic Component 1 | 14.5 | 550 | 0.6 | 4.2 | 0.1 | 1.2 | 3.5 | B |
| Example 26 | Specific Organic Component 1 | 14.5 | 550 | 0.7 | 2.4 | 0.3 | 1.3 | 3.8 | A |
| Example 27 | Specific Organic Component 1 | 14.5 | 550 | 1.1 | 0.7 | 1.6 | 1.5 | 4 | A |
| Comparative Example 11 | Specific Organic Component 1 | 14.5 | 550 | 0.0 | 11.3 | 0.000 | 0.9 | 3.3 | D |
| Comparative Example 12 | Specific Organic Component 1 | 14.5 | 550 | 0.1 | 10.1 | 0.010 | 1 | 3.4 | D |
| Example 28 | Specific Organic Component 1 | 14.5 | 550 | 0.4 | 4.9 | 0.1 | 1.1 | 3.6 | B |
| Example 29 | Specific Organic Component 1 | 14.5 | 550 | 1.0 | 1.0 | 1.0 | 1.4 | 3.4 | A |
| Example 30 | Specific Organic Component 1 | 14.5 | 550 | 2.0 | 1.4 | 1.4 | 2.3 | 4.5 | A |
| Example 31 | Specific Organic Component 1 | 14.5 | 550 | 3.1 | 1.7 | 1.8 | 4.2 | 4.8 | A |
| Example 32 | — | — | — | 1.0 | 1.4 | 0.7 | 1.4 | 3.7 | C |
| Example 33 | Organic Component 2 | 15.5 | 800 or higher (Not Measurable) | 1.0 | 1.4 | 0.7 | 1.4 | 4.1 | B |

TABLE 4-continued

| | | | | | | | | | |
|---|---|---|---|---|---|---|---|---|---|
| Example 34 | Organic Component 3 | 13.5 | 670 | 1.0 | 1.4 | 0.7 | 1.4 | 3.7 | B |
| Example 35 | Organic Component 4 | 13 | 800 or higher (Not Measurable) | 1.0 | 1.4 | 0.7 | 1.4 | 3.9 | C |
| Example 36 | Specific Organic Component 1 | 14.5 | 550 | 0.1 | 1.1 | 0.1 | 1.2 | 3.1 | A |
| Example 37 | Specific Organic Component 1 | 14.5 | 550 | 0.9 | 1.8 | 0.5 | 1.3 | 3.3 | A |
| Example 38 | Specific Organic Component 1 | 14.5 | 550 | 1.0 | 1.9 | 0.5 | 1.2 | 3.4 | A |

The details of the specific organic component 1 and the organic components 2 to 4 shown in Table 4 are shown in the following Table 5.

TABLE 5

| Kind | Compound Name |
|---|---|
| Specific Organic Component 1 | 1-(5-methylureidophenyl)-5-mercaptotetrazole |
| Organic Component 2 | 1-phenyl-1H-tetrazole-5-thiol |
| Organic Component 3 | 5-amino-1,3,4-thiadiazole-2-thiol |
| Organic Component 4 | N-(3-(5-mercapto-1H-tetrazole-1-yl)phenyl)-3-(methyl(pyrrolidine-1-yl)aminopropaneamide |

As shown in Table 4, it can be seen that the coating films B1 to B20 prepared in Examples exhibited excellent oxidative resistance (ozone fastness). In addition, according to the manufacturing method of preparing the dispersion according to Examples, it can be seen that the dispersion including the high-concentration specific flat particles can be manufactured with high productivity. In addition, in a case where the coating films B1 to B20 prepared in Examples are applied to the antireflection optical member, the haze values and the plane alignment values thereof have characteristics contributing to excellent antireflection performance. Accordingly, it can be seen that an antireflection optical member having excellent antireflection performance and oxidation resistance can be formed using each of the coating films prepared in Examples.

[3-1] Preparation of Antireflection Film (Antireflection Optical Member)

Example 39

Using the coating solution B3 prepared in Example 21, an antireflection film (antireflection optical member) was prepared as described above. The antireflection film prepared in Examples has a configuration including a transparent substrate/a hard coat layer/a high refractive index layer/a metal fine particle-containing layer (layer including the specific flat particles)/a low refractive index layer (the dielectric layer according to the present disclosure). The details of each of a hard coat layer-forming coating solution, a high refractive index layer-forming coating solution, and a low refractive index layer-forming coating solution will be described after the description of the preparation of the antireflection optical member.

1. Preparation of Antireflection film

The following hard coat layer-forming coating solution was applied to a surface of a polyethylene terephthalate (PET) film (U403, thickness: 75 µm, manufactured by Toray Industries Inc.) with an easily adhesive layer as a transparent substrate using a wire bar such that the average thickness of the dried coating film was 4 µm, and was heated at 165° C. for 2 minutes, dried, and solidified to form the hard coat layer.

The following high refractive index layer-forming coating solution was applied to the formed hard coat layer using a wire bar such that the average thickness of the dried coating film was 23 nm, and was heated at 135° C. for 2 minutes, dried, and solidified to form the high refractive index layer.

The coating solution B3 prepared in Example 16 was applied to the formed high refractive index layer using a wire bar such that the average thickness of the dried coating film was 30 nm. Next, the applied solution was heated at 130° C. for 1 minute, dried, and solidified to form the metal particle-containing layer including the specific flat particles.

The following low refractive index layer-forming coating solution was applied to the formed metal fine particle-containing layer using a wire bar such that the average thickness of the dried coating film was 70 nm, and was heated and dried at 60° C. for 1 minute. Next, the coating film was cured by irradiating the coating film with ultraviolet light at an irradiation dose of 200 mJ/cm$^2$ using a metal halide (M04-L41) UV lamp (manufactured by Eye Graphics Co., Ltd.) while performing nitrogen purge such that the oxygen concentration was 0.1% or lower. As a result, the low refractive index layer (dielectric layer) was formed.

Through the above-described steps, the antireflection film having the configuration including the transparent substrate/the hard coat layer/the high refractive index layer/the metal fine particle-containing layer/the low refractive index layer (dielectric layer) was obtained.

2. Preparation of Hard Coat Layer-Forming Coating Solution, High Refractive Index Layer-Forming Coating Solution, and Low Refractive Index Layer-Forming Coating Solution (1) Preparation of Hard Coat Layer-Forming Coating Solution A composition A shown in the following Table 6 was mixed to form the hard coat layer-forming coating solution.

TABLE 6

| (Hard Coat Layer-Forming Coating Solution: Composition A) | |
|---|---|
| Polyurethane Aqueous Solution: Takelac WS-5100 (manufactured by Mitsui Chemicals, Inc, concentration of solid contents: 30 mass %) | 520.9 Parts |
| Triazine UV absorber: (Tinuvin 479DW, manufactured by BASF SE, concentration of solid contents: 40 mass %) | 35.5 Parts |
| Surfactant: sodium = bis(3,3,4,4,5,5,6,6-nonafluoro) = 2-sulfoniteoxysuccinate (manufactured by FUJIFILM Finechemicals Co., Ltd, concentration of solid contents: 2 mass %, methanol solution) | 13 Parts |
| 2-butoxyethanol | 100 Parts |
| Water | 342.3 Parts |

(2) Preparation of High Refractive Index Layer-Forming Coating Solution

A composition B shown in the following Table 7 was mixed to form the high refractive index layer-forming coating solution.

TABLE 7

(High Refractive Index Layer-Forming Coating Solution: Composition B)

| | |
|---|---|
| Polyurethane Aqueous Solution: Takelac WS-4000 (manufactured by Mitsui Chemicals, Inc, concentration of solid contents: 30 mass %, Tg = 136° C.) | 8.8 Parts |
| Zirconia water dispersion: SZR-CW (manufactured by Sakai Chemical Industry Co., Ltd., concentration of solid contents: 40 mass %, methanol solution) | 27.4 Parts |
| Surfactant: sodium = bis(3,3,4,4,5,5,6,6-nonafluoro) = 2-sulfoniteoxysuccinate (manufactured by FUJIFILM Finechemicals Co., Ltd, concentration of solid contents: 2 mass %, methanol solution) | 5.3 Parts |
| 2-butoxyethanol | 50.0 Parts |
| Water | 908.5 Parts |

(3) Preparation of Low Refractive Index Layer-Forming Coating Solution

A composition C shown in the following table 8 was mixed to form the low refractive index layer-forming coating solution.

TABLE 8

(Low Refractive Index Layer-Forming Coating Solution: Composition C)

| | |
|---|---|
| Ethyl methyl ketone | 831.16 Parts |
| OPSTER TU2361 (concentration of solid contents: 10%, manufactured by JSR Corporation) | 142.80 Parts |
| M-11 (the following formula) | 17.94 Parts |
| KAYARAD PET-30 (concentration of solid contents: 100%, manufactured by Nippon Kayaku Co., Ltd.) | 1.81 Parts |
| MEK-ST-L (concentration of solid contents 30%, manufactured by Nissan Chemical Industries, Ltd.) | 5.29 Parts |
| Photopolymerization Initiator: IRGACURE 127 (concentration of solid contents: 100%, manufactured by BASF SE) | 0.24 Parts |
| Silaplane FM-0725 (concentration of solid contents: 100%, manufactured by JNC Corporation) | 0.76 Parts |

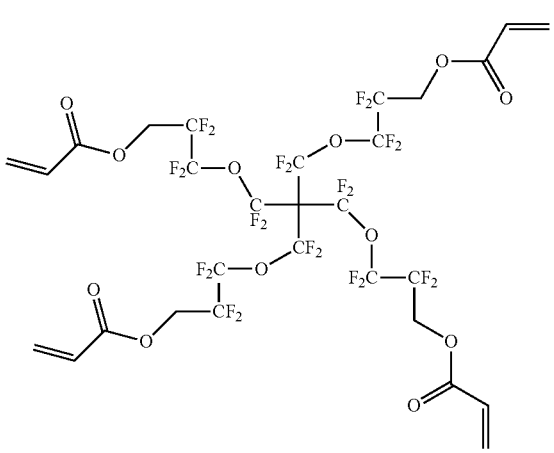

M-11

[3-1] Measurement and Evaluation (III)

(1) Measurement of Haze Value (%)

The haze value of each of the metal fine particle-containing layer formed as described above was 0.6% in case of being measured using a haze meter (NDH-5000, manufactured by Nippon Denshoku Industries Co., Ltd.). This haze value is in a preferable haze value range (0.1% to 3%) for the metal fine particle layer included in the antireflection film.

(2) Measurement and Evaluation of Surface Reflectance

The surface reflectance of the antireflection film obtained as described above was evaluated based on the following evaluation method and evaluation standards. The result was the evaluation level A (lower than 0.5%), and it was found that the antireflection film according to Examples has excellent antireflection performance.

(Evaluation Method)

Black ink (Artline_KR-20_black, manufactured by Shachihata Inc.) was applied to a surface (back surface of the transparent substrate) of the antireflection film opposite to the low refractive index layer, and in a case where light was incident from the low refractive index layer side at an incidence angle of 5°, specular reflection other than reflection in a visible range on the back surface was measured using a UV-VIS-NIR spectrophotometer (V560, manufactured by JASCO Corporation). By measuring the reflectivity in a wavelength range of 450 nm to 650 nm, the average value (hereinafter, referred to as "average reflectance") was calculated and evaluated based on the following standards.

(Evaluation Standards)

A: lower than 0.5%

B: 0.5% or higher and lower than 1.0%

C: 1.0% or higher and lower than 2.0%

D: 2.0% or higher (3) Oxidative Resistance (Ozone Fastness) Evaluation

The oxidative resistance (ozone fastness) of the antireflection film obtained as described above was evaluated using the same method as that of "[2-2] Measurement and Evaluation (II)" and "(3) Oxidative Resistance (Ozone Fastness) Evaluation". The result was the evaluation level A (the difference was 0.2 or lower), and it was found that the antireflection film according to Examples has excellent oxidative resistance.

EXPLANATION OF REFERENCES

D: Equivalent Circle Diameter of Principal Plane of Particle
a: Thickness of Particle
1: Antireflection Optical Member
10: Transparent Substrate
12: Metal Fine Particle-Containing Layer
14: Dielectric Layer
14a: Thickness of Dielectric Layer
d: Thickness of Metal Fine Particle-Containing Layer
20: Gold-Coated Flat Silver Particle
24: Partially Connected State of Particles
26: Conduction Path
28: Binder
θ: Angle between Metal Fine Particle-Containing Layer and Principal Plane of Gold-Coated Flat Silver Particle
f: Range where 80% by Number or Higher of Gold-Coated Flat Silver Particles were Included
100: Gold-Coated Flat Silver Particle
101: Flat Silver Particle
102: Gold Coating Layer The disclosure of Japanese Patent Application No. 2017-071849 filed on Mar. 31, 2017 is incorporated herein in its entirety. All publications, patent applications, and technical standards mentioned in this specification are herein incorporated by reference to the same extent as if each individual publication, patent application, or technical standard was specifically and individually indicated to be incorporated by reference.

What is claimed is:

1. A gold-coated flat silver particle dispersion, comprising:
   gold-coated flat silver particles comprising:
      flat silver particles, and
      a gold coating layer,
         wherein an average thickness of the gold coating layer on principal planes of the particles is 0.1 nm to 2 nm, and
         wherein a ratio of the average thickness of the gold coating layer on the principal planes of the particles to an average thickness of the gold coating layer on edge surfaces of the particles is 0.02 or higher;
   a dispersion medium; and
   an organic component in which a solubility product pKsp with a silver ion is 14 or higher and a reduction potential is lower than 700 mV.

2. The gold-coated flat silver particle dispersion according to claim 1,
   wherein the average thickness of the gold coating layer on the principal planes of the particles is 0.7 nm to 1.5 nm, and
   the ratio of the average thickness of the gold coating layer on the principal planes of the particles to the average thickness of the gold coating layer on the edge surfaces of the particles is 0.02 or higher.

3. The gold-coated flat silver particle dispersion according to claim 1, wherein an aspect ratio of the particles is from 2 to 80.

4. The gold-coated flat silver particle dispersion according to claim 1, wherein a silver concentration is 2 mmol/L or higher.

5. A method of manufacturing the gold-coated flat silver particle dispersion according to claim 1, the method comprising:
   a flat silver particle manufacturing step; and
   a gold coating step,
   wherein the flat silver particle manufacturing step includes a step of preparing a mixed solution including water, a silver salt, a dispersant, and a reducing agent and a step of mixing another silver salt in a solid state with the mixed solution obtained in the step of preparing the mixed solution and is a step of obtaining a flat silver particle dispersion, and
   the gold coating step is a step of obtaining the gold-coated flat silver particle dispersion by mixing a gold coating solution with the flat silver particle dispersion obtained in the flat silver particle manufacturing step, the gold coating solution including water, a gold salt, and a complexing agent in which a reduction potential of a complex formed using the complexing agent and gold ions is 0.5 V or lower.

6. The method of manufacturing the gold-coated flat silver particle dispersion according to claim 5,
   wherein before the gold coating step, an edge surface adsorbent of the flat silver particles is added to the flat silver particle dispersion obtained in the flat silver particle manufacturing step.

7. The method of manufacturing the gold-coated flat silver particle dispersion according to claim 5,
   wherein in the gold coating step, a molar ratio of an addition amount of the complexing agent in which the reduction potential of the complex formed using the complexing agent and gold ions is 0.5 V or lower to an addition amount of the gold salt is in a range of 2.5 to 10.

8. The method of manufacturing the gold-coated flat silver particle dispersion according to claim 5,
   wherein after the gold coating step, an organic component in which a solubility product pKsp with silver ions is 14 or higher and a reduction potential is lower than 700 mV is added to the gold-coated flat silver particle dispersion.

9. The method of manufacturing the gold-coated flat silver particle dispersion according to claim 5, wherein a silver concentration of the gold-coated flat silver particle dispersion is 2 mmol/L or higher.

10. A coating film, comprising:
    gold-coated flat silver particles comprising flat silver particles and a gold coating layer, wherein an average thickness of the gold coating layer on principal planes of the particles is 0.1 nm to 2 nm, and wherein a ratio of the average thickness of the gold coating layer on the principal planes of the particles to an average thickness of the gold coating layer on edge surfaces of the particles is 0.02 or higher; and
    an organic component in which a solubility product pKsp with silver ions is 14 or higher and a reduction potential is lower than 700 mV.

11. An antireflection optical member that prevents incidence light of visible light from being reflected, the antireflection optical member comprising:
    a laminate structure in which a transparent substrate, a metal fine particle-containing layer and a dielectric layer are laminated in this order,
    wherein the coating film comprises gold-coated flat silver particles comprising flat silver particles and a gold coating layer, wherein an average thickness of the gold coating layer on principal planes of the particles is 0.1 nm to 2 nm, and wherein a ratio of the average thickness of the gold coating layer on the principal planes of the particles to an average thickness of the gold coating layer on edge surfaces of the particles is 0.02 or higher, wherein principal planes of the gold-coated flat silver particles are aligned in a range of 0° to 30° with respect to a surface of the metal fine particle-containing layer, the gold-coated flat silver particles are arranged in the metal fine particle-containing layer without forming a conduction path, and a thickness of the dielectric layer is set such that, in a case where incidence light is incident from a surface side of the dielectric layer to the laminate structure, reflected light on the surface of the dielectric layer is canceled out by interfering with reflected light at an interface between the dielectric layer and the metal fine particle-containing layer.

* * * * *